US008751056B2

(12) United States Patent
Slaby et al.

(10) Patent No.: US 8,751,056 B2
(45) Date of Patent: Jun. 10, 2014

(54) USER COMPUTER DEVICE WITH TEMPERATURE SENSING CAPABILITIES AND METHOD OF OPERATING SAME

(75) Inventors: Jiri Slaby, Buffalo Grove, IL (US); John H. Krahenbuhl, McHenry, IL (US); Rachid M. Alameh, Crystal Lake, IL (US); Thomas Y. Merrell, Beach Park, IL (US)

(73) Assignee: Motorola Mobility LLC, Chicago, IL (US)

( * ) Notice: Subject to any disclaimer, the term of this patent is extended or adjusted under 35 U.S.C. 154(b) by 387 days.

(21) Appl. No.: 13/307,150

(22) Filed: Nov. 30, 2011

(65) Prior Publication Data

US 2012/0072044 A1    Mar. 22, 2012

Related U.S. Application Data

(63) Continuation-in-part of application No. 12/744,509, filed on May 25, 2010, now Pat. No. 8,269,210.

(60) Provisional application No. 61/513,460, filed on Jul. 29, 2011.

(51) Int. Cl.
*G06F 19/00* (2011.01)
*G06F 3/041* (2006.01)
*G01K 13/00* (2006.01)

(52) U.S. Cl.
CPC ........ G06F 3/041 (2013.01); *G06F 2221/0746* (2013.01); *G01K 13/00* (2013.01)
USPC ............ 700/299; 709/228; 709/230; 709/237

(58) Field of Classification Search
CPC ................ G06F 2203/04808; G06F 2213/00; G06F 2221/0746; G01K 13/00
USPC ................... 700/299, 300; 709/228, 230, 237
See application file for complete search history.

(56) References Cited

U.S. PATENT DOCUMENTS 4,286,289 A    8/1981 Ottesen et al.
4,806,709 A    2/1989 Evans
(Continued)

FOREIGN PATENT DOCUMENTS

CN    1407506 A    4/2003
CN    101019089 A    8/2007
(Continued)

OTHER PUBLICATIONS

United States Patent and Trademark Office "Non-Final Rejection" for U.S. Appl. No. 12/471,062, filed Feb. 22, 2012, 15 pages.
(Continued)

*Primary Examiner* — Michael D Masinick

(57) ABSTRACT

A user computer device is provided that comprises a temperature sensitive touchscreen having a temperature sensitive user interface comprising multiple thermal energy emitter/detector devices, such as thermocouples. The multiple thermal energy emitter/detector devices are capable both of detecting thermal energy and emitting thermal energy. The temperature sensitive user interface generates thermal patterns that may be transferred to other thermally sensitive electronic devices or that may be used to authenticate the user computer device. The user computer device also can detect and thermally communicate with a thermal energy docking station and, based on thermal recognition, activate applications displayed on the temperature sensitive touchscreen. Further, the user computer device can auto-bias a temperature of the temperature sensitive user interface in order to better assure proper operation of the temperature sensitive user interface in all operating conditions.

22 Claims, 18 Drawing Sheets

(56) References Cited

U.S. PATENT DOCUMENTS

| | | |
|---|---|---|
| 4,914,624 A | 4/1990 | Dunthorn |
| 4,967,083 A | 10/1990 | Kornbrekke et al. |
| 5,179,369 A | 1/1993 | Person et al. |
| 5,414,413 A | 5/1995 | Tamaru et al. |
| 5,684,294 A | 11/1997 | Kouhi |
| 5,781,662 A | 7/1998 | Mori et al. |
| 5,793,486 A | 8/1998 | Gordon et al. |
| 5,821,521 A | 10/1998 | Bridgelall et al. |
| 5,880,411 A | 3/1999 | Gillespie et al. |
| 5,945,988 A | 8/1999 | Williams et al. |
| 6,002,427 A | 12/1999 | Kipust |
| 6,107,994 A | 8/2000 | Harada et al. |
| 6,147,677 A | 11/2000 | Escobosa et al. |
| 6,184,538 B1 | 2/2001 | Bandara et al. |
| 6,185,950 B1 | 2/2001 | Baruschke et al. |
| 6,215,116 B1 | 4/2001 | Van Marcke |
| 6,246,407 B1 | 6/2001 | Wilks et al. |
| 6,246,862 B1 | 6/2001 | Grivas |
| 6,292,674 B1 | 9/2001 | Davis |
| 6,330,457 B1 | 12/2001 | Yoon |
| 6,438,752 B1 | 8/2002 | McClard |
| 6,460,183 B1 | 10/2002 | Van Der Vleuten |
| 6,517,257 B2 | 2/2003 | Tohmon et al. |
| 6,525,854 B1 | 2/2003 | Takahashi et al. |
| 6,666,081 B1 | 12/2003 | Babinsky et al. |
| 6,681,056 B1 | 1/2004 | Tseng et al. |
| 6,721,954 B1 | 4/2004 | Nickum |
| 6,804,012 B2 | 10/2004 | Gombert |
| 6,816,154 B2 | 11/2004 | Wong et al. |
| 6,925,413 B2 | 8/2005 | Krieg et al. |
| 6,933,922 B2 | 8/2005 | Casebolt et al. |
| 6,941,161 B1 | 9/2005 | Bobisuthi et al. |
| 7,012,637 B1 | 3/2006 | Blume et al. |
| 7,046,230 B2 | 5/2006 | Zadesky et al. |
| 7,134,092 B2 | 11/2006 | Fung et al. |
| 7,166,966 B2 | 1/2007 | Naugler, Jr. et al. |
| 7,212,835 B2 | 5/2007 | Mantyjarvi et al. |
| 7,220,958 B2 | 5/2007 | Kitamura et al. |
| 7,224,382 B2 | 5/2007 | Baker |
| 7,237,929 B2 | 7/2007 | Stahl |
| 7,324,671 B2 | 1/2008 | Li et al. |
| 7,327,245 B2 | 2/2008 | Krumm et al. |
| 7,340,077 B2 | 3/2008 | Gokturk et al. |
| 7,368,703 B2 | 5/2008 | De Samber et al. |
| 7,380,716 B2 | 6/2008 | Yokoyama |
| 7,468,689 B2 | 12/2008 | Ma et al. |
| 7,486,386 B1 | 2/2009 | Holcombe et al. |
| 7,489,297 B2 | 2/2009 | Hohmann et al. |
| 7,515,177 B2 | 4/2009 | Yoshikawa |
| 7,519,918 B2 | 4/2009 | Trantow |
| 7,532,196 B2 | 5/2009 | Hinckley |
| 7,534,988 B2 | 5/2009 | Kong et al. |
| 7,557,965 B2 | 7/2009 | Taylor et al. |
| 7,561,146 B1 | 7/2009 | Hotelling |
| 7,576,525 B2 | 8/2009 | So et al. |
| 7,630,716 B2 | 12/2009 | Tamura et al. |
| 7,687,774 B2 | 3/2010 | Ohta et al. |
| 7,688,283 B2 | 3/2010 | Jung et al. |
| 7,715,723 B2 | 5/2010 | Kagawa et al. |
| 7,721,310 B2 | 5/2010 | Schaffer et al. |
| 7,728,958 B2 | 6/2010 | Pfaff |
| 7,795,584 B2 | 9/2010 | Mok et al. |
| 7,814,791 B2 | 10/2010 | Andersson et al. |
| 7,855,716 B2 | 12/2010 | McCreary et al. |
| 7,912,376 B2 | 3/2011 | Rollins |
| 7,967,451 B2 | 6/2011 | Chen et al. |
| 7,971,156 B2 | 6/2011 | Albertson et al. |
| 7,991,575 B2 | 8/2011 | Vogel et al. |
| 7,991,896 B2 | 8/2011 | Shen et al. |
| 7,994,468 B2 | 8/2011 | Duijve et al. |
| 7,995,041 B2 | 8/2011 | Chang |
| 8,006,002 B2 | 8/2011 | Kalayjian et al. |
| 8,013,904 B2 | 9/2011 | Tan et al. |
| 8,018,501 B2 | 9/2011 | Sasaki |
| 8,023,061 B2 | 9/2011 | Ra |
| 8,030,914 B2 | 10/2011 | Alameh et al. |
| 8,072,469 B2 | 12/2011 | Ottney |
| 8,104,113 B2 | 1/2012 | Rodenbeck et al. |
| 8,335,593 B2 * | 12/2012 | Johnson et al. ............... 700/285 |
| 8,633,901 B2 * | 1/2014 | Orr et al. ...................... 345/173 |
| 2001/0019338 A1 | 9/2001 | Roth |
| 2001/0033475 A1 * | 10/2001 | Lillios et al. ................. 361/687 |
| 2002/0104081 A1 | 8/2002 | Candelore et al. |
| 2002/0122072 A1 | 9/2002 | Selker |
| 2002/0199186 A1 | 12/2002 | Ali et al. |
| 2003/0034439 A1 | 2/2003 | Reime et al. |
| 2003/0063128 A1 | 4/2003 | Salmimaa et al. |
| 2003/0129964 A1 | 7/2003 | Kohinata et al. |
| 2003/0222917 A1 | 12/2003 | Trantow |
| 2004/0183787 A1 | 9/2004 | Geaghan et al. |
| 2004/0207997 A1 | 10/2004 | Stewart et al. |
| 2005/0104860 A1 | 5/2005 | McCreary et al. |
| 2005/0150697 A1 | 7/2005 | Altman et al. |
| 2005/0198029 A1 | 9/2005 | Pohja et al. |
| 2005/0232447 A1 | 10/2005 | Shinozuka et al. |
| 2005/0289182 A1 | 12/2005 | Pandian et al. |
| 2006/0010400 A1 | 1/2006 | Dehlin et al. |
| 2006/0028453 A1 | 2/2006 | Kawabe |
| 2006/0031786 A1 | 2/2006 | Hillis et al. |
| 2006/0049152 A1 | 3/2006 | Matus |
| 2006/0067573 A1 | 3/2006 | Parr et al. |
| 2006/0125799 A1 | 6/2006 | Hillis et al. |
| 2006/0132456 A1 | 6/2006 | Anson |
| 2006/0161870 A1 | 7/2006 | Hotelling et al. |
| 2006/0161871 A1 | 7/2006 | Hotelling et al. |
| 2006/0256074 A1 | 11/2006 | Krum et al. |
| 2007/0057955 A1 * | 3/2007 | McKay .......................... 345/550 |
| 2007/0058255 A1 | 3/2007 | Imai et al. |
| 2007/0109266 A1 | 5/2007 | Davis et al. |
| 2007/0137462 A1 | 6/2007 | Barros et al. |
| 2007/0177803 A1 | 8/2007 | Elias et al. |
| 2007/0180392 A1 | 8/2007 | Russo |
| 2007/0195074 A1 | 8/2007 | Gelissen |
| 2007/0220437 A1 | 9/2007 | Boillot |
| 2007/0242054 A1 | 10/2007 | Chang et al. |
| 2007/0247643 A1 | 10/2007 | Nakamura et al. |
| 2008/0005703 A1 | 1/2008 | Radivojevic et al. |
| 2008/0006762 A1 | 1/2008 | Fadell et al. |
| 2008/0024454 A1 | 1/2008 | Everest |
| 2008/0024992 A1 * | 1/2008 | Pflueger ....................... 361/705 |
| 2008/0052643 A1 | 2/2008 | Ike et al. |
| 2008/0061899 A1 | 3/2008 | Stolpman |
| 2008/0079902 A1 | 4/2008 | Mandelstam-Manor et al. |
| 2008/0100928 A1 | 5/2008 | Wilson |
| 2008/0122803 A1 | 5/2008 | Izadi et al. |
| 2008/0129688 A1 | 6/2008 | Richardson et al. |
| 2008/0161870 A1 | 7/2008 | Gunderson |
| 2008/0165140 A1 | 7/2008 | Christie et al. |
| 2008/0192005 A1 | 8/2008 | Elgoyhen et al. |
| 2008/0195735 A1 | 8/2008 | Hodges et al. |
| 2008/0204427 A1 | 8/2008 | Heesemans et al. |
| 2008/0211771 A1 | 9/2008 | Richardson |
| 2008/0219672 A1 | 9/2008 | Tam et al. |
| 2008/0225041 A1 | 9/2008 | El Dokor et al. |
| 2008/0240568 A1 | 10/2008 | Tonouchi |
| 2008/0252595 A1 | 10/2008 | Boillot |
| 2008/0256494 A1 | 10/2008 | Greenfield |
| 2008/0259053 A1 | 10/2008 | Newton |
| 2008/0266083 A1 | 10/2008 | Midholt et al. |
| 2008/0280642 A1 | 11/2008 | Coxhill et al. |
| 2008/0297487 A1 | 12/2008 | Hotelling et al. |
| 2008/0303681 A1 | 12/2008 | Herz et al. |
| 2008/0309641 A1 | 12/2008 | Harel et al. |
| 2009/0021488 A1 | 1/2009 | Kali et al. |
| 2009/0031258 A1 | 1/2009 | Arrasvuori et al. |
| 2009/0061823 A1 | 3/2009 | Chu |
| 2009/0092284 A1 | 4/2009 | Breed et al. |
| 2009/0158203 A1 | 6/2009 | Kerr et al. |
| 2009/0277697 A1 | 11/2009 | Bolt et al. |
| 2009/0299633 A1 | 12/2009 | Hawes et al. |
| 2009/0303176 A1 | 12/2009 | Chen et al. |
| 2010/0167783 A1 | 7/2010 | Alameh et al. |
| 2010/0271312 A1 | 10/2010 | Alameh et al. |
| 2010/0271331 A1 | 10/2010 | Alameh et al. |

(56) References Cited

U.S. PATENT DOCUMENTS

| | | | |
|---|---|---|---|
| 2010/0295772 | A1 | 11/2010 | Alameh et al. |
| 2010/0295773 | A1 | 11/2010 | Alameh et al. |
| 2010/0295781 | A1 | 11/2010 | Alameh et al. |
| 2010/0297946 | A1 | 11/2010 | Alameh et al. |
| 2010/0299390 | A1 | 11/2010 | Alameh et al. |
| 2010/0299642 | A1 | 11/2010 | Merrell et al. |
| 2011/0006190 | A1 | 1/2011 | Alameh et al. |
| 2011/0009194 | A1 | 1/2011 | Gabai et al. |
| 2011/0012716 | A1* | 1/2011 | Miller, IV .................. 340/407.2 |
| 2011/0014983 | A1* | 1/2011 | Miller, IV ...................... 463/37 |
| 2011/0148752 | A1 | 6/2011 | Alameh et al. |
| 2012/0068952 | A1 | 3/2012 | Slaby et al. |
| 2012/0072044 | A1 | 3/2012 | Slaby et al. |
| 2012/0072157 | A1 | 3/2012 | Alameh et al. |

FOREIGN PATENT DOCUMENTS

| | | |
|---|---|---|
| CN | 101305337 A | 11/2008 |
| CN | 1805568 A | 12/2008 |
| EP | 1445922 A1 | 8/2004 |
| EP | 1553427 A1 | 7/2005 |
| EP | 1657819 A2 | 5/2006 |
| EP | 1760573 A2 | 3/2007 |
| EP | 2000896 A2 | 12/2008 |
| EP | 20037349 A2 | 3/2009 |
| JP | 02280427 A | 11/1990 |
| JP | 2005293419 A | 10/2005 |
| JP | 2006010489 A | 1/2006 |
| JP | 2007042020 A | 2/2007 |
| JP | 2009085799 A | 4/2009 |
| WO | 9528777 A1 | 10/1995 |
| WO | 0241129 A2 | 6/2002 |
| WO | 03023701 A2 | 3/2003 |
| WO | 03076870 A1 | 9/2003 |
| WO | 2005076542 A1 | 8/2005 |
| WO | 2005101176 A2 | 10/2005 |
| WO | 2008016394 A2 | 2/2008 |
| WO | 2008073289 A3 | 6/2008 |

OTHER PUBLICATIONS

Kim, et al., "The gesture watch: a wireless contact-free gesture based wrist interface", 2007, 11th IEEE International Symposium on Wearable Computers, pp. 15-22.
United States Patent and Trademark Office "Non-Final Rejection" for U.S. Appl. No. 12/646,601, filed Feb. 14, 2012, 9 pages.
Starner et al., The gesture pendant: A self-illuminating, wearable, infared computer vision system for home automation control and medical monitoring:, 2000, IEEE 4th Internatioinal Symposium on Wearable Computers, pp. 87-94.
H. Ruser, Object recognition with a smart low-cost active infared sensor array:, Nov. 21-23, 2005, 1st International Conference on Sensing Technology, pp. 494-499.
United States Patent and Trademark Office "Final Rejection" for U.S. Appl. No. 12/428,187, filed Apr. 10, 2012, 10 pages.
United States Patent and Trademark Office "Final Rejection" for U.S. Appl. No. 12/428,266, filed Mar. 14, 2012, 9 pages.
United States Patent and Trademark Office "Non-Final Rejection" for U.S. Appl. No. 12/500,625, filed Dec. 29, 2011, 7 pages.
United States Patent and Trademark Office "Non-Final Rejection" for U.S. Appl. No. 12/646,199, filed Mar. 9, 2012, 17 pages.
United States Patent and Trademark Office "Non-Final Rejection" for U.S. Appl. No. 12/645,244, filed May 24, 2012, 8 pages.
United States Patent and Trademark Office "Non-Final Rejection" for U.S. Appl. No. 12/648,503, filed Feb. 2, 2012, 7 pages.
Patent Cooperation Treaty, International Search Report and Written Opinion of the International Searching Authority for International Application No. PCT/US2011/031161, Nov. 18, 2011, 14 pages.
Specification of the Bluetooth System: Master Table of Contents & Compliance Requirements; Covered Core Package V.3.0+HS; Apr. 21, 2009, all pages.
G.Yun and M.Kavehrad, "Spot diffusing and fly-eye receivers for indoor infrared wireless communications", Proc. 1992 IEEE, Conf. Sel, Topics in Wireless Comm., Vancouver, BC, Canada, Jun. 25-26, 1992, pp. 286-292.
Kahn, J.M.; You, R., Djahani, P., Weisbin, A.G."Imaging Diversity Receivers for high-speed infrared wireless communication", IEEE Communications Mag., Dec. 1998, Accessed May 7, 2009; 7 pages.
Ward, A.; Jones A.; Hopper A.; "A new location technique for the active office"; IEEE Personal Communications, 1997; 0 accessed May 7, 2009; 11 pages.
Metzger, C.; Anderson, M.; Starner, T., "FreeDigiter: A contact-free device for gesture control"; Wearable Computers, 2004; ISWC 2004, 8th International Symposium, vol. 1, Oct. 31/Oct. 4, 2004, pp. 18-21.
Von Hardenberg, C.; Berard F.; "Bare-hand human-computer interaction" PUI; ACM 1-58113-448-7 Nov. 14, 2001; 0 Orlando, FL, USA; 8 pages.
TracklR: Vector Expansion: True 6DOF view control offer 3-dimensional virtual reality via motion control; TRACKIR by NaturalPoint; www.naturalpoint.com; 2 pages Aug. 2005.
Bricklin, D.; Gestures, the iPhone, and Standards: A Developer's Questions, www.bricklin.com, 10 pages, 1999-2009.
Gearlog, Microsoft's sidesight: something Apple show watch, www.gearlog.com; 5 pages, 1996-2008, Zift Davis Publ. Holdings, Inc.
Hadamard transform—Wikipedia definition; http://en.wikipedia.org/wikilHadamard_transform; 4 pages, Oct. 2009.
Silicon Laboratories, Inc.; Si1120 Evaluation Kit User's Guide, Austin, TX, Dec. 2009, 10 pages; www.silabs.com/supporttpages/contacttechnicalsupport.aspx.
Pavlov, Vladislav et al.: "Model-based object characterization with active infrared sensor array", IEEE Sensors 2007 Conference, 280-31 Oct. 2007, 1-4244-1262-5/07/2007, pp. 360-363.
Christensen, Henrik Vie: "Retrieval of 3D-Position of a Passive Object Using infrared LED's and Photodiodes", Acoustics Speech and Signal Processing 2005, Proceedigns ICASSP 05 IEEE International Conference on (2005), vol. 4, pp. iv/1093-iv/1096 vol. 4.
United States Patent and Trademark Office "Non-Final Rejection" for U.S. Appl. No. 12/744,509 Aug. 29, 2013, 36 pages.
United States Patent and Trademark Office, "Non-Final Rejection" for U.S. Appl. No. 13/307,334 dated Mar. 28, 2014, 9 pages.
The State Intellectual Property Office of the People'S Republic of China, "Notification of the First Office Action" for Chinese Patent Application No. 201080022152.1 dated Oct. 25, 2013, 11 pages.
United States Patent and Trademark Office "Non-Final Rejection" for U.S. Appl. No. 12/641,830 Sep. 20, 2012, 8 pages.
United States Patent and Trademark Office "Non-Final Rejection" for U.S. Appl. No. 12/428,187 Sep. 24, 2012, 8 pages.
The State Intellectual Property Office of the People'S Republic of China, "Notification of the First Office Action" for Chinese Patent Application No. 201080031007.X dated Dec. 18, 2013, 9 pages.
United States Patent and Trademark Office "Final Rejection" for U.S. Appl. No. 12/646,199 (MTA-35935]) Sep. 17, 2012, 21 pages.
McKENNA, Michael "Interactive Viewpoint Control and Three-Dimensional Operations" Proceedings of the 1992 Symposium on Interactive 3D Graphics, 1992, pp. 53-56.

* cited by examiner

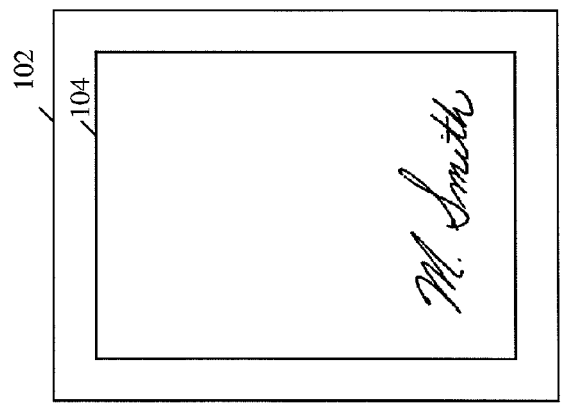
FIG. 11
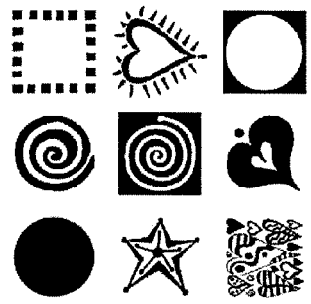
FIG. 10
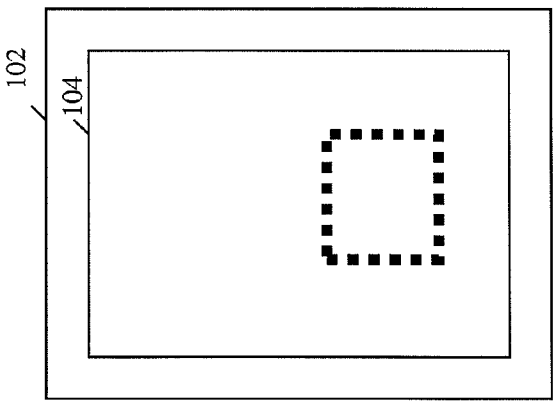
FIG. 13
FIG. 12

USER COMPUTER DEVICE WITH TEMPERATURE SENSING CAPABILITIES AND METHOD OF OPERATING SAME

CROSS-REFERENCE TO RELATED APPLICATIONS

This application is a continuation-in-part of, and claims priority from, U.S. patent application Ser. No. 12/774,509, entitled "MOBILE DEVICE WITH TEMPERATURE SENSING CAPABILITY AND METHOD OF OPERATING SAME," and filed May 5, 2010, and also claims priority from U.S. patent application Ser. No. 61/513,460, entitled "USER COMPUTER DEVICE WITH TEMPERATURE SENSING CAPABILITIES AND METHOD OF OPERATING SAME," and filed Jul. 29, 2011, which applications hereby are incorporated herein in their entirety. Further, this application is related to U.S. patent application Ser. Nos. 13/307,232 and 13/307,334 each entitled "USER COMPUTER DEVICE WITH TEMPERATURE SENSING CAPABILITIES AND METHOD OF OPERATING SAME," and each filed on the same date as this application.

FIELD OF THE INVENTION

The present invention relates generally to user computer devices and, in particular, to a user computer device with a touchscreen having temperature sensing capabilities.

BACKGROUND OF THE INVENTION

Mobile devices such as cellular telephones, smart phones and other handheld or portable electronic devices such as personal digital assistants (PDAs), headsets, MP3 players, etc. have become popular and ubiquitous. Such mobile devices now often include numerous different types of input devices and/or sensors that allow for the mobile device to sense/receive signals indicative of a variety of user commands and/or operational conditions. For example, many mobile devices now include not merely buttons that can be pressed by a user, but also input devices such as touch sensitive screens or navigation devices. Also, many mobile devices now include other sensors such as sensors that can detect incoming light signals such as infrared signals, as well as sensors that sense position or movement of the mobile device including, for example, accelerometers.

The operational conditions or context of a mobile device can be of interest for a variety of reasons. Yet, despite the number of different types of input devices/sensors that are already implemented in conventional mobile devices, there still remain a variety of operational conditions that cannot be easily detected, or detected at all, by way of such existing input devices/sensors. Indeed, the use of conventional input devices/sensors can be impeded by particular circumstances so as to preclude accurate determinations regarding certain types of operational conditions.

Therefore, for the above reasons, it would be advantageous if mobile device(s) could be developed that had improved capabilities in terms of detecting one or more mobile device operational conditions and providing support for such improved detection capabilities.

BRIEF DESCRIPTION OF THE DRAWINGS

FIGS. 10 and 11 depict exemplary physical images that may be thermally generated and displayed on the temperature sensitive touchscreen of the user computer device of FIG. 1 in accordance with various embodiments of the present invention.

FIGS. 12 and 13 are block diagrams depicting a display of exemplary thermally generated physical images on the temperature sensitive touchscreen of the user computer device of FIG. 1 in accordance with various embodiments of the present invention.

Figure 1:
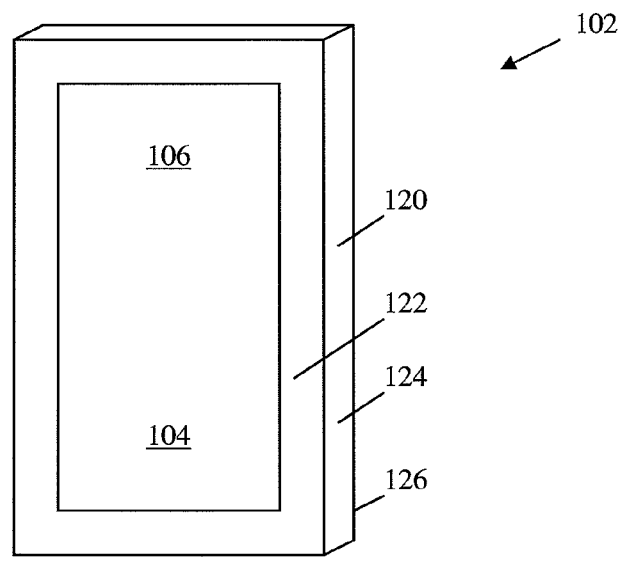
FIG. 1 is a block diagram of a user computer device in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a mobile device that had improved capabilities in terms of detecting one or more mobile device operational conditions and providing support for improved detection capabilities, a user computer device, such as a mobile device, is provided that comprises a temperature sensitive touchscreen having a temperature sensitive user interface comprising multiple thermal energy emitter/detector devices, such as thermocouples. The multiple thermal energy emitter/detector devices are capable both of detecting thermal energy and generating thermal energy. The temperature sensitive user interface generates thermal patterns that may be transferred to other thermally sensitive electronic devices or that may be used to authenticate the user computer device. The user computer device also can detect and thermally communicate with a thermal energy docking station and, based on thermal recognition, activate applications displayed on the temperature sensitive touchscreen. Further, the user computer device can auto-bias a temperature of the temperature sensitive user interface in order to better assure proper operation of the temperature sensitive user interface in all operating conditions.

Generally, an embodiment of the present invention encompasses a method for thermal information transfer by a user computer device comprising a housing and a temperature sensitive touchscreen having a plurality of thermal energy emitter/detector devices. The method includes determining a thermal pattern to be thermally transferred, activating one or more thermal energy emitter/detector devices, of the plurality of thermal energy emitter/detector devices, corresponding to the thermal pattern, producing, by the activated one or more thermal energy emitter/detector devices, the thermal pattern on one or more of the touchscreen and the housing, and thermally transferring the produced thermal pattern to another temperature sensitive touchscreen.

Another embodiment of the present invention comprises a method for thermal authentication of a user computer device. The method includes retrieving an authentication pattern to be thermally generated on a temperature sensitive touchscreen, activating, in a temperature sensitive user interface, only thermal energy emitter/detector devices corresponding to the authentication pattern, and thermally generating, by the activated thermal energy emitter/detector devices, the authentication pattern in the thermally sensitive touchscreen.

Yet another embodiment of the present invention comprises a method for thermal recognition of an external accessory device that may be used in conjunction with a user computer device. The method includes detecting, by the user computer device, a thermal pattern that identifies the external accessory device, in response to detecting the thermal pattern and based on the detected thermal pattern, performing one or more of: activating, by the user computer device, an application corresponding to the detected thermal pattern adjusting, by the user computer device, an operational setting of the user computer device, such as brightness, volume, touch sensitivity, feature priority, and establishing a wireless connectivity, such as a Bluetooth or WiFi connectivity with a detected Bluetooth or WiFi device, based on the detected thermal pattern, and executing, by the user computer device, the one or more of the activated application, the adjusted setting, and the establishment of the wireless connectivity.

Still another embodiment of the present invention comprises a method for biasing a temperature of a temperature sensitive user interface of a user computer device, the method including detecting one or more of a temperature of the user computer device and an ambient temperature, determining to pre-bias the temperature sensitive user interface based on the detected one or more temperatures, and, in response to determining to pre-bias the temperature sensitive user interface, auto-biasing a temperature of the temperature sensitive user interface.

Yet another embodiment of the present invention encompasses a user computer device that includes a housing, an at least one memory device that maintains at least one thermal pattern, a touchscreen comprising a temperature sensitive user interface having a plurality of thermal energy emitter/detector devices, and a processor coupled to the touchscreen and the at least one memory device and that is configured to determine to transfer a thermal pattern of the at least one thermal pattern and activate one or more thermal energy emitter/detector devices, of the plurality of plurality of thermal energy emitter/detector devices, corresponding to the thermal pattern, wherein the activated thermal energy emitter/detector devices produce the thermal pattern on one or more of the touchscreen and the housing.

Still another embodiment of the present invention comprises a user computer device that includes an at least one memory device that maintains an authentication pattern, a touchscreen comprising a temperature sensitive user interface having a plurality of thermal energy emitter/detector devices, a processor coupled to the touchscreen and the at least one memory device and that is configured to retrieve the authentication pattern, activate, in the temperature sensitive user interface, only thermal energy emitter/detector devices corresponding to the authentication pattern, and wherein the activated thermal energy emitter/detector devices thermally generate the authentication pattern in the thermally sensitive touchscreen.

Yet another embodiment of the present invention comprises a user computer device that is capable of thermally recognizing an external accessory device. The user computer device comprises a housing, an at least one memory device that maintains a thermal pattern that identifies the external accessory device, a temperature sensitive user interface having a plurality of thermal energy emitter/detector devices, and a processor that is coupled to the housing, the at least one memory device, and the temperature sensitive user interface and that is configured to detect, via the temperature sensitive user interface, the at least one thermal pattern that identifies the external accessory device, in response to detecting the thermal pattern and based on the detected thermal pattern, perform one or more of: activating an application corresponding to the detected thermal pattern, adjusting an operational setting of the user computer device, and establishing a wireless connectivity with the external accessory device, and execute the one or more of the activated application, the adjusted setting, or the establishment of the wireless connectivity.

Still another embodiment of the present invention comprises an electronic device for thermally interfacing with a user computer device. The electronic device includes a thermal energy interface that is configured to exchange thermal energy with the user computer device and a processor coupled to the thermal energy interface that is configured to one or more of generate a thermal pattern in the thermal energy interface that may be detected by the user computer device and detect a thermal pattern emitted by the user computer device.

Still another embodiment of the present invention comprises a user computer device that auto-biases a temperature sensitive user interface. The a user computer device includes a housing, a temperature sensitive user interface having a plurality of thermal energy devices that are configured to one or more of emit thermal energy and detect thermal energy, and a processor coupled to the temperature sensitive user interface that is configured to detect one or more of a temperature of the user computer device and an ambient temperature, determine to pre-bias the temperature sensitive user interface based on the detected one or more temperatures, and in response to determining to pre-bias the temperature sensitive user interface, based on the ambient temperature, auto-bias a temperature of the temperature sensitive user interface.

Turning now to the drawings, the present invention may be more fully described with reference to FIGS. 1-29. FIG. 1 is a block diagram of an exemplary user computer device 102 in accordance with an embodiment of the present invention. User computer device 102 may be any user computer device that allows a user to input instructions to the device via a touchscreen 104 and, optionally, may be capable of sending and receiving communication signals on a wireless network. Preferably, user computer device 102 is a wireless mobile device, such as a cellular telephone, a radio telephone, a smart phone, or a personal digital assistant (PDA), a laptop computer or a tablet computer with radio frequency (RF) capabilities, or any other handheld or portable electronic device with a user interface comprising a touchscreen 104 that allows a user to input instructions into the user computer device; however, user computer device 102 may be any type of user computer device, such as a personal computer or a laptop or tablet computer without wireless capabilities, that has a user interface that includes a temperature sensitive touchscreen. User computer device further comprises a housing 120 with a front side 122 that includes touchscreen 104, side edges 124, and a back side 126.

Figure 2:
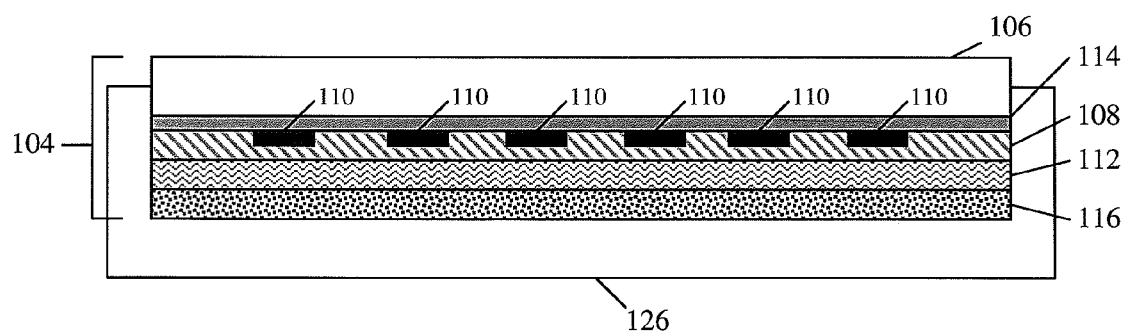
FIG. 2 is a cross-sectional side view of the user computer device of FIG. 1 in accordance with an embodiment of the present invention.

Referring now to FIGS. 1 and 2, touchscreen 104 is a 'temperature sensitive' touchscreen that includes a touchscreen panel 106, typically an insulator such as glass or plastic, and a thermal interface, that is, a temperature sensitive user interface 108. Temperature sensitive user interface 108 includes thermal energy emitter/detector componentry that allows for detection of a temperature differential existing between different locations on temperature sensitive user interface 108. The thermal energy emitter/detector componentry more particularly includes multiple thermal energy emitter/detector devices 110 positioned proximate to, or embedded in, panel 106 of touchscreen 104. As will be described further below, each of thermal energy emitter/detector devices 110 may, based on a detected thermal energy, generate electrical signals that are indicative of the temperatures detected at the thermal energy emitter/detector device. The multiple thermal energy emitter/detector devices 110 also, or instead, may be capable of generating and emitting thermal energy, for example, in response to application of a voltage to the device, which emitted thermal energy may be sensed by a user of user computer device 102 or by an external accessory designed to do so, for example, other user computer devices, thermal sensitive paper, or a user computer device thermal docking station as described below. For example, each thermal energy emitter/detector device 110 may be a thermocouple junction capable of generating a voltage in response to detection, by the device, thermal energy and generating thermal energy in response to application, to the device, of a voltage.

By virtue of processing performed by user computer device 102 utilizing the information communicated by way of thermal energy emitter/detector devices 110, and more particularly, electrical signals generated by the thermal energy emitter/detector devices that reflect detected temperatures, the user computer device is able to sense a temperature differential existing between the temperatures sensed by different sensing devices (or different groups of sensing devices) which is indicative of a temperature differential existing between the locations of those different sensing devices (or groups of sensing devices). This temperature differential information then may used in combination with other information obtained via other types of sensors by user computer device 102 to determine/predict an operational condition or context of the user computer device.

User computer device 102 further may include a layer of thermally sensitive film or ink 112 proximate to temperature sensitive user interface 108 and thermal energy emitter/detector devices 110. In one embodiment of the present invention, an activating of thermal energy emitter/detector devices 110 causes the devices to generate thermal energy, in turn causing a heating up of the thermally sensitive film or ink 112 proximate to the heated up thermal energy emitter/detector devices, thereby producing an image and/or color change in the film or ink corresponding to the heated up devices, which image may be displayed to a user of the user computer device. However, temperature sensitive user interface 108 need not be restricted to areas of user computer device 102 proximate to touchscreen 104. For example, housing 120 also, or instead, may include the layer of thermally sensitive film or ink 112, such as a thermochromic film. As described in greater detail below, temperature sensitive user interface 108 may be located proximate to any outer surface of user computer device 102, that is, proximate to, or included in, any part of housing 120. An activation of temperature sensitive user interface 108, and in particular thermal energy emitter/detector devices 110 of the temperature sensitive user interface, proximate to any part of housing 120 then may produce an image and/or color change in the thermally sensitive film or ink associated with the housing and corresponding to the heated up devices.

Touchscreen 104 further may include a touch-detecting non-temperature-based user interface 114, such as a capacitive user interface, a resistive user interface, a pressure-sensitive user interface, an optical user interface, or any other user interface that may occur to one of ordinary skill in the art that detects a position of a user's touch on a basis other than temperature, and an active visual display user interface 116 that is implemented using any of multiple well-known backlit display technologies, such as but not limited to a liquid crystal display (LCD), a light emitting diode (LED) display, an organic LED (OLED) display, a plasma display, e-ink, or any other well-known backlit display technology, that displays visual images on touchscreen 104 to a user of the user computer device 102. One may note that the layers of user interfaces depicted in FIG. 2 are provided merely for the purpose of illustrating the principles of the present invention and are not intended to limit touchscreen 104 to the order depicted and that the layering may be in any order and/or may be intermixed.

Figure 3:
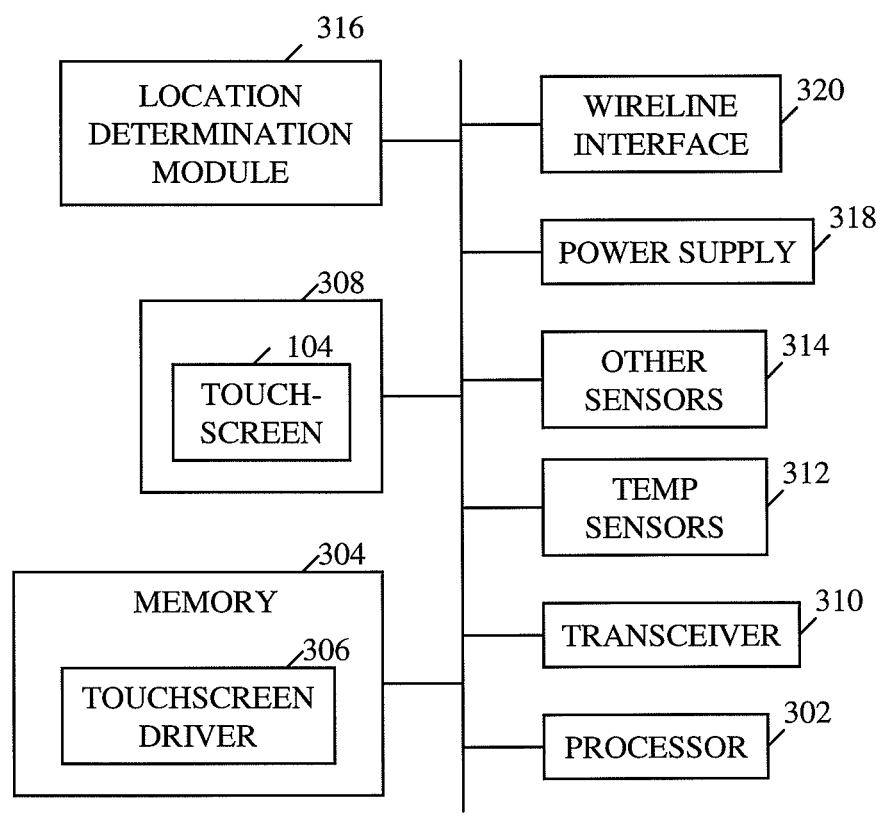
FIG. 3 is a block diagram of an exemplary user computer device in accordance with an embodiment of the present invention.
Figure 4:
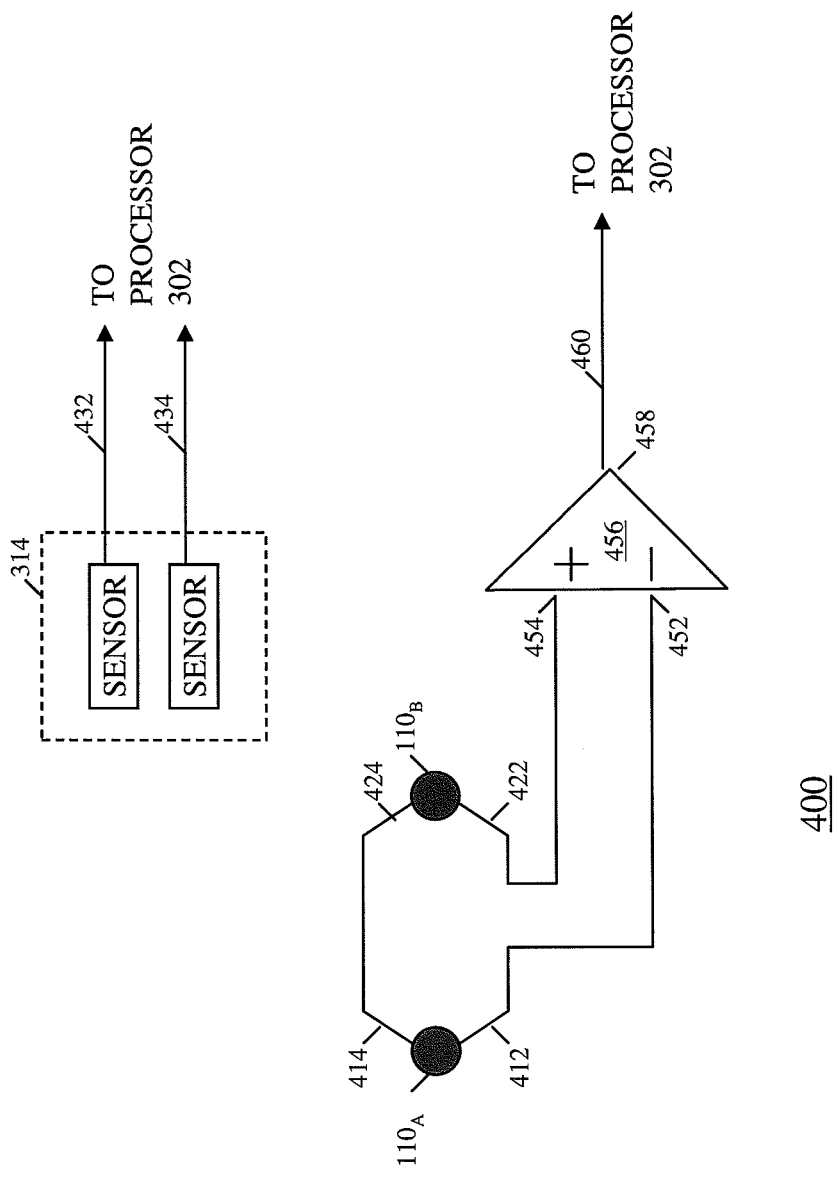
FIG. 4 is an electrical schematic diagram of the user computer device of FIG. 1 in accordance with an embodiment of the present invention.
Figure 5:
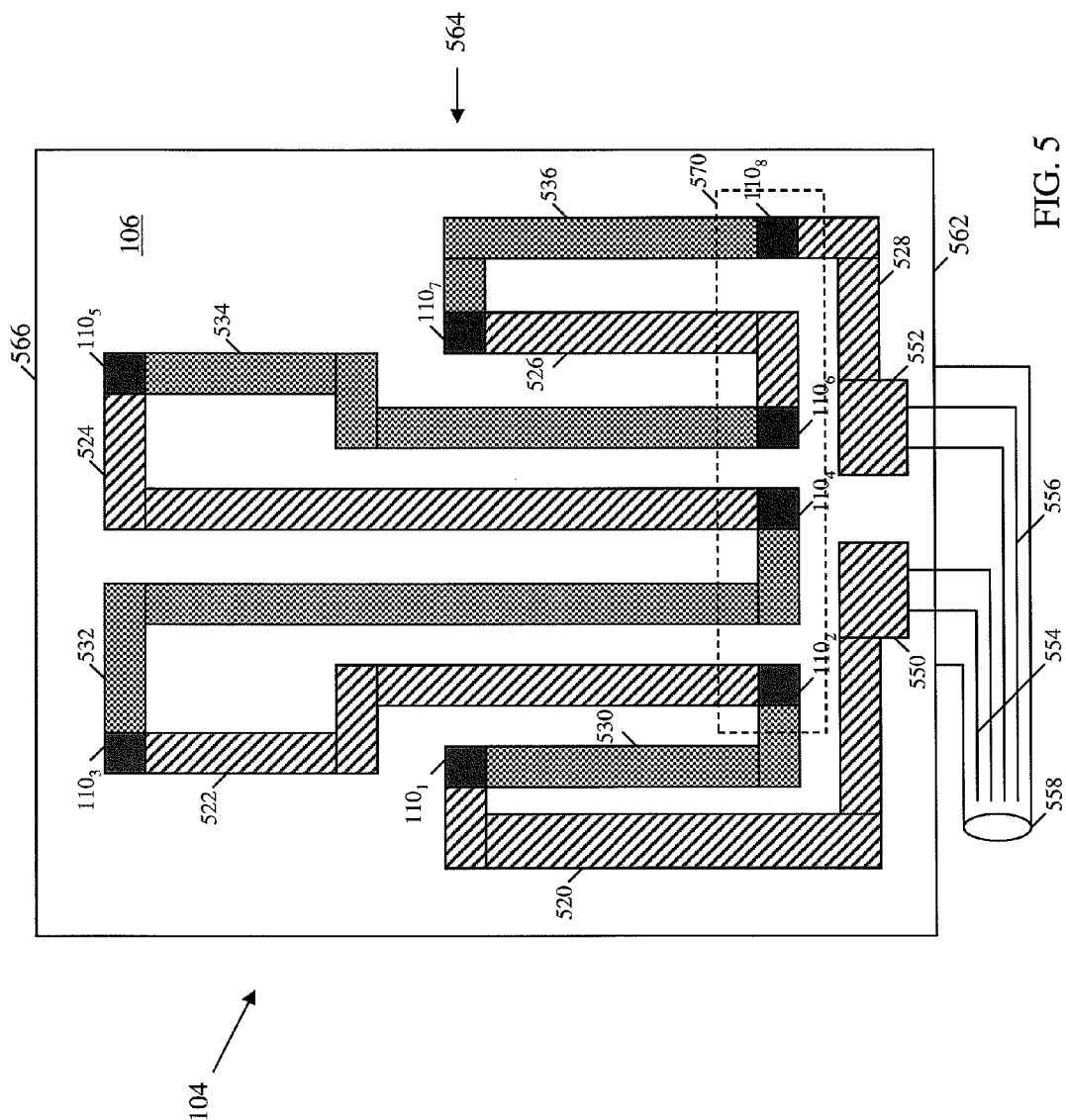
FIG. 5 is a schematic diagram of an exemplary layout of multiple thermal energy emitter/detector devices of a temperature sensitive user interface associated with the touchscreen of the user computer device of FIG. 1 in accordance with an embodiment of the present invention.

Referring now to FIGS. 3-5, block diagrams are depicted of user computer device 102 in accordance with various embodiments of the present invention. Referring first to FIG. 3, user computer device 102 includes a processor 302 such as one or more microprocessors, microcontrollers, digital signal processors (DSPs), combinations thereof or such other devices known to those having ordinary skill in the art. The particular operations/functions of processor 302, and respectively thus of user computer device 102, are determined by an execution of software instructions and routines that are stored in an at least one memory device 304 associated with the processor, such as random access memory (RAM), dynamic random access memory (DRAM), and/or read only memory (ROM) or equivalents thereof, that store data and programs that may be executed by the corresponding processor. However, one of ordinary skill in the art realizes that the operations/functions of processor 302 alternatively may be implemented in hardware, for example, integrated circuits (ICs), application specific integrated circuits (ASICs), a programmable logic device such as a PLD, PLA, FPGA or PAL, and the like, implemented in the user computer device. Based on the present disclosure, one skilled in the art will be readily capable of producing and implementing such software and/or hardware without undo experimentation. Unless otherwise indicated, the functions described herein as being performed by user computer device 102 are performed by processor 302.

At least one memory device 304 further maintains multiple applications that may be executed by processor 302, such as a calendar application, a navigational application, an email application, a music application, a video application, a video game application, and a social network application. In addition, At least one memory device 304 may maintain, in association with each such application, a thermal pattern that identifies the application. By communicating the thermal pattern to the user communication device, a user or external device is able to instruct the user communication device to retrieve the associated application and to execute the retrieved application by processor 302.

User computer device 102 further includes a user interface 308 and, optionally, one or more of a transceiver 310, a location determination module 316, and a wireline interface 320, for example, a USB (Universal Serial Bus) port, that are each coupled to processor 302. Transceiver 310 includes at least one wireless receiver (not shown) and at least one wireless transmitter (not shown) for receiving and transmitting wireless signals, such a radio frequency (RF) signals and/or short-range signals such as Bluetooth signals. Location determination module 316, such as a GPS (Global Positioning Satellite) module comprising a GPS receiver, a module that determines a position based on triangulation of received WiFi or base station signals, or any other location positioning method/module known in the art, determines a geographical location of the user computer device. User interface 308 includes a display screen that comprises 'thermally sensitive' touchscreen 104, and further may include a keypad, buttons, a touch pad, a joystick, an additional display, or any other device useful for providing an interface between a user and an electronic device such as user computer device 102.

User computer device 102 further includes a touchscreen driver 306 that is maintained in at least one memory device 304 and that is executed by processor 302, and temperature sensors 312 and other sensors 314, for example, an ambient light sensor, an accelerometer, a gyroscope, and any other sensor, and in particular operational setting sensor, known in the art that may be included in a user computer device, such as a handheld or portable electronic device, in communication with the processor. Processor 302 detects images sensed by temperature sensitive user interface 108 and touch-detecting non-temperature-based interface 114, and controls images displayed by the temperature sensitive user interface and by active visual display user interface 116, based on programs and data associated with touchscreen driver 306.

To the extent FIG. 3 is intended to show the internal components of user computer device 102, the temperature sensors 312 include thermal energy emitter/detector devices 110. Depending upon the embodiment, temperature sensors 312 can include any arbitrary number of thermal energy emitter/detector devices, and the temperature sensors can include a variety of different types of thermal energy emitter/detector devices. With respect to the other sensors 314, these can include any one or more of a variety of different types of sensors. In the present embodiment, the other sensors 314 can include a capacitive touch sensor and/or a resistive touch sensor or any other type of touch-sensitive component that are included in touch-detecting non-temperature-based user interface 114. User computer device 102 also includes a power supply 318, such as a power converter for interfacing with a power outlet or a limited life power supply such as a removable and/or rechargeable battery, for providing power to the other internal components 302, 304, 308, 310, 312, 314, and 316 of user computer device 102.

Touchscreen driver 306 comprises data and programs that control an operation of touchscreen 104, such as sensing a temperature change in temperature sensitive user interface 108 of the touchscreen and determining a location of a touch on the touchscreen, and that may reconfigure an operation of the touchscreen as described in greater detail below. In addition to being a temperature sensitive touchscreen, touchscreen 104 also may be a 'capacitive' touchscreen as is known in the art. For example, touchscreen panel 106, typically an insulator such as glass, may be coated, on an inner surface, with touch-detecting non-temperature-based user interface 114 comprising a transparent electrical conductor, such as indium tin oxide (ITO). In other examples of a capacitive touchscreen, touch-detecting non-temperature-based user interface 114 may comprise a grid-type pattern of metallic electrodes that may be embedded in touchscreen panel 106 or etched in a conductor coupled to an inner surface of the touchscreen panel or printed on a carrier material, such as any of various known optically clear ITO coated transparent, conductive film products, for example, an ITO on a PET (polyethylene terephthalate) carrier (ITOPET). The electrical conductor is, in turn, coupled processor 302 and is controlled by touchscreen driver 306. Touching the outer, uncoated surface of touchscreen panel 106 with an electrical conductor, such as a human body or a capacitive stylus, results in a change in an electrostatic field and a corresponding change in capacitance that is detected by touchscreen driver 306.

As noted above, touchscreen 104 is a temperature sensitive touchscreen, for example, as described in U.S. patent application Ser. No. 12/774,509, entitled "Mobile Device with Temperature Sensing Capability and Method of Operating Same," and filed on May 5, 2010, and which description of a thermally sensitive mobile device touchscreen is hereby incorporated herein. Temperature sensitive user interface 108 may be proximate to an inner surface of touchscreen panel 106 or may be embedded in the panel. For example, the multiple thermal energy emitter/detector devices 110 may be embedded in, or may be attached to on an inner surface of, the touchscreen panel. Thermal energy emitter/detector devices 110 are devices that sense an applied temperature and output an indication of the sensed temperature, such as a thermocouple formed by a respective junction of first and second types of materials, for example, a Indium Tin Oxide ($InSnO_4$) ceramic material (ITO) and a Indium Tin Oxide Manganese ceramic material (ITO:Mn), and may be distributed throughout temperature sensitive user interface 108, and correspondingly throughout touchscreen 104 (and in a different plane, that is, above or below, the capacitive user interface associate with the touchscreen, or may be intermixed with the capacitive user interface).

Certain thermal energy emitter/detector devices 110 may be linked to each other by a graphite strip or other thermally-conductive strip so as to maintain the thermal energy emitter/detector devices at a same or substantially a same temperature, which temperature may be set at a temperature level different from that of an item that will touch touchscreen 104, such as an exposed finger, a gloved finger, or a stylus. Thermal energy emitter/detector devices 110 also may be electrically connected in series to enhance touch sensitivity as well as to enable differential drive functionality. Junctions connected in series result in alternating junction polarities due to thermocouple conductor type order. Junctions in phase are grouped together for additive response and those with opposite polarities are separated and in some cases used to drive opposing device sides for differential response. In yet other cases, opposing polarity junctions are kept at a known and same temperature for reference and are enabled by applying a Graphite type material in their vicinity. By grouping same polarity junctions, touch sensitivity is enhanced. As a result, when two of the thermal energy emitter/detector devices 110 that share a same polarity each experience a same temperature, the voltages generated by the thermal energy emitter/detector devices all tend to increase (or decrease) generally uniformly and tend to be additive, and the resulting output voltage experienced at terminals connected to the thermal energy emitter/detector devices (which voltage is, in turn, read by processor 302 implementing touchscreen driver 306) will be the sum of the contributions from those thermal energy emitter/detector devices. Whereas when two of the thermal energy emitter/detector devices 110 that are of opposite polarity each experience a same temperature, a voltage increase (or decrease) generated by one of the temperature sensing device due to the particular temperature will tend to be offset by a corresponding voltage increase (or decrease) generated by the other of the temperature sensing device. Thus processor 302 is able to determine a location of a touch based on temperature differentials.

Turning to FIG. 4, an electrical schematic diagram 400 is provided showing how signals from thermal energy emitter/detector devices 110 can be processed to derive a differential temperature signal, as well as how that differential temperature signal can be processed along with other signals from other supporting sensors 314, in accordance with an embodiment of the present invention. As shown, two thermal energy emitter/detector devices 110 (depicted in FIG. 4 as thermal energy emitter/detector devices $110_A$ and $110_B$) are coupled in series between an inverting input 452 and a non-inverting input 454 of an operational amplifier 456. More particularly, a first lead 412 of a first temperature sensing device $110_A$ of the two thermal energy emitter/detector devices $110_A$ and $110_B$, is coupled to the inverting input 452, a first lead 422 of a second temperature sensing device $110_B$ of the two thermal energy emitter/detector devices $110_A$ and $110_B$ is coupled to the non-inverting input 454, and a second lead 414 of the first temperature sensing device $110_A$ is coupled to a second lead 424 of the second temperature sensing device $110_B$. In response to input signals, for example, voltage or current signals, generated by the first and second thermal energy emitter/detector devices (or groups of devices) $110_A$, $110_B$, operational amplifier 456 generates an output signal at output terminal 458 that is proportional to the differential between the two input signals and thus proportional to the difference in temperatures experienced by the two thermal energy emitter/detector devices $110_A$, $110_B$.

Additionally as shown in FIG. 4, the differential temperature output signal provided at output terminal 458 is sent to processor 302 by way of a communication link 460 (although not shown, an analog-to-digital converter can be provided as part of communication link 460 between output terminal 458 and processor 302 so that the differential temperature output signal is in digital form when provided to processor 302). In addition to receiving the differential temperature output signal, processor 302 also receives one or more signals from one or more other sensors 314, for example, by way of additional communication links 432 and 434, respectively. It should be further noted that, while for simplicity of illustration, in FIG. 3 the temperature sensing circuitry depicted in FIG. 4 are all considered to be part of temperature sensors 312 (along with the thermal energy emitter/detector devices $110_A$ and $110_B$), in other embodiments such devices/components other than the specific components that sense temperature can be considered to be distinct from the temperature sensors, and can be located physically apart from the temperature sensors. For example, the operational amplifier 456 can, in another embodiment, be considered part of the processor 302. Depending upon the signals provided to it from the temperature sensors 312 and the other sensors 314, processor 302 can determine a variety of operational conditions/contexts as will be discussed in further detail below.

Referring now to FIG. 5, a schematic diagram is provided of an exemplary layout of multiple thermal energy emitter/detector devices 110 as can be arranged on user computer device 102 in accordance with an embodiment of the present invention. As illustrated by FIG. 5, each of multiple thermal energy emitter/detector devices 110, depicted in FIG. 5 as thermal energy emitter/detector devices $110_1$-$110_8$ (eight shown; however, any quantity is possible), is a thermocouple formed by a respective junction of an ITO lead and an ITO:Mn lead, and these leads are all interconnected in a manner by which all of the thermal energy emitter/detector devices $110_1$-$110_8$ are connected in series between a first terminal 550 and a second terminal 552. Further as shown, the first and second terminals 550 and 552 respectively are coupled to respective copper wires 554, 556 that are surrounded by a flexible plastic sheathe 558 so as to form a two-wire flex link. Although shown in cut-away, it will be understood that the copper wires 554, 556 and sheathe 558 extend away from the terminals 550, 552 and allow those terminals to be coupled to other components (for example, to an operational amplifier that is, in turn, coupled to processor 302).

More particularly as shown, the first terminal 550, an ITO lead, is linked to a first temperature sensing device $110_1$ of the multiple thermal energy emitter/detector devices $110_1$-$110_8$ by way of a first ITO lead 520, and that temperature sensing device is, in turn, linked to a second temperature sensing device $110_2$ of the multiple thermal energy emitter/detector devices $110_1$-$110_8$ by way of a first ITO:Mn lead 530. A second ITO lead 522 extends from the second temperature sensing device $110_2$ to a third temperature sensing device $110_3$ the multiple thermal energy emitter/detector devices $110_1$-$110_8$, and a second ITO:Mn lead 532 links the third temperature sensing device $110_3$ to a fourth temperature sensing device $110_4$ of the multiple thermal energy emitter/detector devices $110_1$-$110_8$. A third ITO lead 524 in turn links the fourth temperature sensing device $110_4$ to a fifth temperature sensing device $110_5$ of the multiple thermal energy emitter/detector devices $110_1$-$110_8$, which then is connected to a sixth temperature sensing device $110_6$ of the multiple thermal energy emitter/detector devices $110_1$-$110_8$ by way of a third ITO:Mn lead 534. The sixth temperature sensing device $110_6$ is, in turn, connected to a seventh temperature sensing device $110_7$ of the multiple thermal energy emitter/detector devices $110_1$-$110_8$ by way of a fourth ITO lead 526. Finally the seventh temperature sensing device $110_7$ is connected to an eighth temperature sensing device $110_8$ by way of a fourth ITO:Mn lead 536. The eighth temperature sensing device $110_8$ is linked, by way of a fifth ITO lead 528, to the second terminal 552, which is also an ITO lead.

In implementing thermocouple-type thermal energy emitter/detector devices 110, the manner in which each temperature sensing device 110 is interconnected with other components (and the correspondent polarity of the device relative to other components) often is of significance in implementing the temperature sensing device, particularly where multiple thermal energy emitter/detector devices of this type are connected in series. For example, in an embodiment in which there are two thermocouple-type thermal energy emitter/detector devices 110 that are interconnected as shown in FIG. 4, it is typical that the respective polarities of the thermal energy emitter/detector devices/thermocouples will be oppositely-orientated so as to allow for differential temperature sensing. Given such an orientation, assuming that the two thermal energy emitter/detector devices 110 each experience the same temperature, a voltage increase (or decrease) generated by one of the thermal energy emitter/detector devices due to the particular temperature will tend to be offset by a corresponding voltage increase (or decrease) generated by the other of the thermal energy emitter/detector devices. Alternatively, assuming that there is a temperature differential between the two thermal energy emitter/detector devices 110 such that the two devices output different voltages, the difference between those voltages will be experienced by an operational amplifier across terminals 550 and 552.

The embodiment of user computer device 102 depicted in FIG. 5 is an exemplary embodiment in which multiple thermal energy emitter/detector devices 110 are distributed at three different general regions along an inner surface of touchscreen 104 of the user computer device. Notwithstanding the fact that more than two thermal energy emitter/detector devices 110 are employed and coupled together in series, it is possible to obtain meaningful temperature information because of the particular manner in which the thermal energy emitter/detector devices are interconnected. As will be noticed from FIG. 5, each of the thermal energy emitter/detector devices $110_2$, $110_4$, $110_6$, and $110_8$ that are located proximate a bottom edge 562 of touchscreen 104 are formed by the intersection of a respective one of the ITO:Mn leads 530, 532, 534, 536 extending away from the respective temperature sensing device generally upwardly (that is, towards a top edge 566 of user computer device 102) and a respective ITO lead 522, 524, 526, 528 that extends away from each of those respective thermal energy emitter/detector devices also generally upwardly but to the right of the respective ITO lead for that temperature sensing device (except in the case of the eighth temperature sensing device $110_8$, from which the ITO lead 528 extends downwardly (that is, towards the bottom edge 562 of user computer device 102)) and to the left. By comparison, each of the first and seventh thermal energy emitter/detector devices $110_1$, $110_7$ towards a midregion 564 of touchscreen 104 is connected to a respective one of the ITO leads 520, 526 extending away from that temperature sensing device generally downwardly and also to one of the ITO:Mn leads 530, 536 extending generally downwardly and to the right of the respective ITO lead for that device (it is the same for the third and fifth thermal energy emitter/detector devices $110_3$, $110_5$ near the top edge 566 of touchscreen 104).

Given this type of configuration, the second, fourth, sixth, and eighth thermal energy emitter/detector devices $110_2$, $110_4$, $110_6$, and $110_8$ all share a first polarity, while the first, third, fifth, and seventh thermal energy emitter/detector devices $110_1$, $110_3$, $110_5$, and $110_7$ all share a second polarity that is opposite the first polarity. Consequently, should a high temperature be experienced generally along the bottom region of the mobile device 562 proximate the sensing devices $110_2$, $110_4$, $110_6$, and $110_8$, the voltages generated by those respective thermal energy emitter/detector devices all tend to increase (or decrease) generally uniformly and tend to be additive, and the resulting output voltage experienced at the terminals 550 and 552 will be the sum of the contributions from those four sensing devices. Such reinforcing behavior of the thermal energy emitter/detector devices $110_2$, $110_4$, $110_6$, and $110_8$ is particularly facilitated by the presence of the graphite strip 570. Likewise, if a particular temperature is experienced along the top edge 566 or the midregion 564, then the pairs of thermal energy emitter/detector devices $110_3$/$110_5$ and $110_1$/$110_7$ at those respective locations will tend to generate voltages that are additive and reinforcing of one another, and the resulting output voltage experienced at the terminals 550, 552 will be the sum of the contributions of any one or more of those thermal energy emitter/detector devices.

It should be noted that the configuration of FIG. 5 is reflective of certain assumptions regarding the operation of user computer device 102. In particular, the arrangement of the multiple thermal energy emitter/detector devices $110_1$-$110_8$ presumes that it is unlikely that a user will touch (that is, apply heat proximate to) both one or more of the thermal energy emitter/detector devices $110_2$, $110_4$, $110_6$, and $110_8$ near the bottom edge 562 while at the same time touch one or more of the thermal energy emitter/detector devices $110_1$, $110_3$, $110_5$, and $110_7$ at the midregion 564 or near the top edge 566. Rather, typically a user will only touch one or more of the thermal energy emitter/detector devices near the bottom edge 562 or touch one or more of the other thermal energy emitter/detector devices $110_1$, $110_3$, $110_5$, and $110_7$, but not both. Such an assumption is especially plausible if the placement of some of the thermal energy emitter/detector devices is at or proximate to a location on user computer device 102 at which heat is less likely to be applied (for example, near a microphone on a mobile device). Given this assumption, it is unlikely that the voltages generated by the thermal energy emitter/detector devices $110_2$, $110_4$, $110_6$, and $110_8$ will be cancelled out by the voltages generated by the thermal energy emitter/detector devices $110_1$, $110_3$, $110_5$, and $110_7$ due to touching of the user computer device by a user.

The configuration of FIG. 5 additionally illustrates how, in some embodiments of the present invention, various advantages can be achieved by utilizing multiple thermal energy emitter/detector devices provided within a given region of touchscreen 104 rather than utilizing only a single temperature sensing device to sense a temperature at a given region of the touchscreen. In particular, FIG. 5 shows that multiple thermal energy emitter/detector devices, such as the devices $110_2$, $110_4$, $110_6$, and $110_8$ can be collectively employed, effectively as a single 'group sensor,' so as to sense the temperature within a given region of touchscreen 104, that is, proximate the bottom edge 562 of the touchscreen. Likewise, FIG. 5 shows that the multiple thermal energy emitter/detector devices $110_1$, $110_3$, $110_5$, and $110_7$ can be collectively employed, again effectively as a group sensor (or as multiple group sensors each made up of two thermal energy emitter/detector devices), to sense the temperature(s) at either one or both of the midregion 564 and proximate the top edge 566 of touchscreen 104. Insofar as these thermal energy emitter/detector devices operate as group sensors, temperature changes occurring nearing any of the sensing devices of the group sensor are sensed quickly. This is in contrast to other embodiments where only a single temperature sensing device is present within a given region, such that temperature changes must be communicated to the location of that particular temperature sensing device before those changes are sensed.

Additionally, FIG. 5 illustrates how in some operational conditions it is possible for a variety of different temperature conditions within a variety of different regions of the mobile device can be sensed simply by series-connecting any arbitrary number of thermal energy emitter/detector devices 110 and using the simple hardware shown in (or hardware similar to that shown in) FIG. 4. In particular, it will be understood from FIG. 5 that temperature changes experienced proximate the bottom edge 562 of touchscreen 104 will have twice the effect as temperature changes experienced merely within the midregion 564 of the touchscreen, since four of the thermal energy emitter/detector devices are located near the bottom edge 562 while only two of the thermal energy emitter/detector devices are located near the midregion 564.

Similarly, in other embodiments, by providing different numbers of thermal energy emitter/detector devices 110 at different regions of interest around touchscreen 104, the overall voltage signals produced by the series-connection of those thermal energy emitter/detector devices can be interpreted to determine temperature changes occurring at (and temperature differentials occurring between) those numerous different regions of the touchscreen. For example, suppose four thermal energy emitter/detector devices were located in a first region, for example, a 5 millimeter (mm) circle, and are connected in series, and a single thermal energy emitter/detector device was located in another, second region, for example, another 5 mm circle, and assuming that all of the thermal energy emitter/detector devices are referenced to a separate cold junction, then temperature changes occurring at the first region would have four times the impact upon the overall output voltage of the five series-connected thermal energy emitter/detector devices than temperature changes occurring in the second region, and thus the overall output voltage could be interpreted accordingly.

Numerous other embodiments with numerous other types of thermal energy emitter/detector devices 110 and configurations thereof are additionally intended to be encompassed by the present invention. For example, sets of multiple thermal energy emitter/detector devices 110 positioned proximate to different edges of the touchscreen can all be connected in series with one another. Also for example, where a set of thermal energy emitter/detector devices 110 are intended to operate as a 'group sensor' associated with a particular region of the touchscreen, the proximity of those thermal energy emitter/detector devices with respect to one another can vary depending upon the embodiment. Further, for example, in some embodiments, one or more thermal energy emitter/detector devices 110 can serve as a touch sensor. For example, by placing thermal energy emitter/detector devices 110 along sides edges 124 of user computer device 102, it is then possible to determine which side, or region of a particular side, of the user computer device is warmer and then conclude that the warmer side, or region, is the side or region that the user is holding, or to detect the way user is holding the user computer device.

Further, in some embodiments, sensed temperature information (including sensed temperature information available from groups of sensors) can be interpreted as an indication of keypad entries or other user input signals or instructions. In one embodiment of this type, a first set of thermal energy emitter/detector devices 110, for example, 20 thermal energy emitter/detector devices, can be placed within a first region of touchcsreen 104 and serve as a first 'button' while a second set of thermal energy emitter/detector devices 110 different in number, for example, one device, can be placed in a second region and serve as a second 'button.' Assuming all of the thermal energy emitter/detector devices 110 of the two sets are coupled in series, the user computer device then can detect whether the first region or the second region is touched based upon whether a voltage signal that is detected is large, for example, from the 20 devices, due to heating of the first region from the user's finger, or small, for example, from the one device, due to heating of the second region from the user's finger.

Further, in still other embodiments of the present invention, thermal energy emitter/detector devices 110 may be implemented so that thermocouple junctions are situated immediately along the exterior of the touchscreen (that is, the junctions just pierce out of the mobile device as "dots"). Such embodiments can provide even more rapid response times, in terms of how fast temperature changes are sensed, than embodiments where the thermocouple junctions are embedded within a touch screen (much less where the junctions are beneath overlying structures). In general, for quickest sensing/response times, it is desirable to minimize the distance between the thermocouple junction and the heat source.

Figure 6:
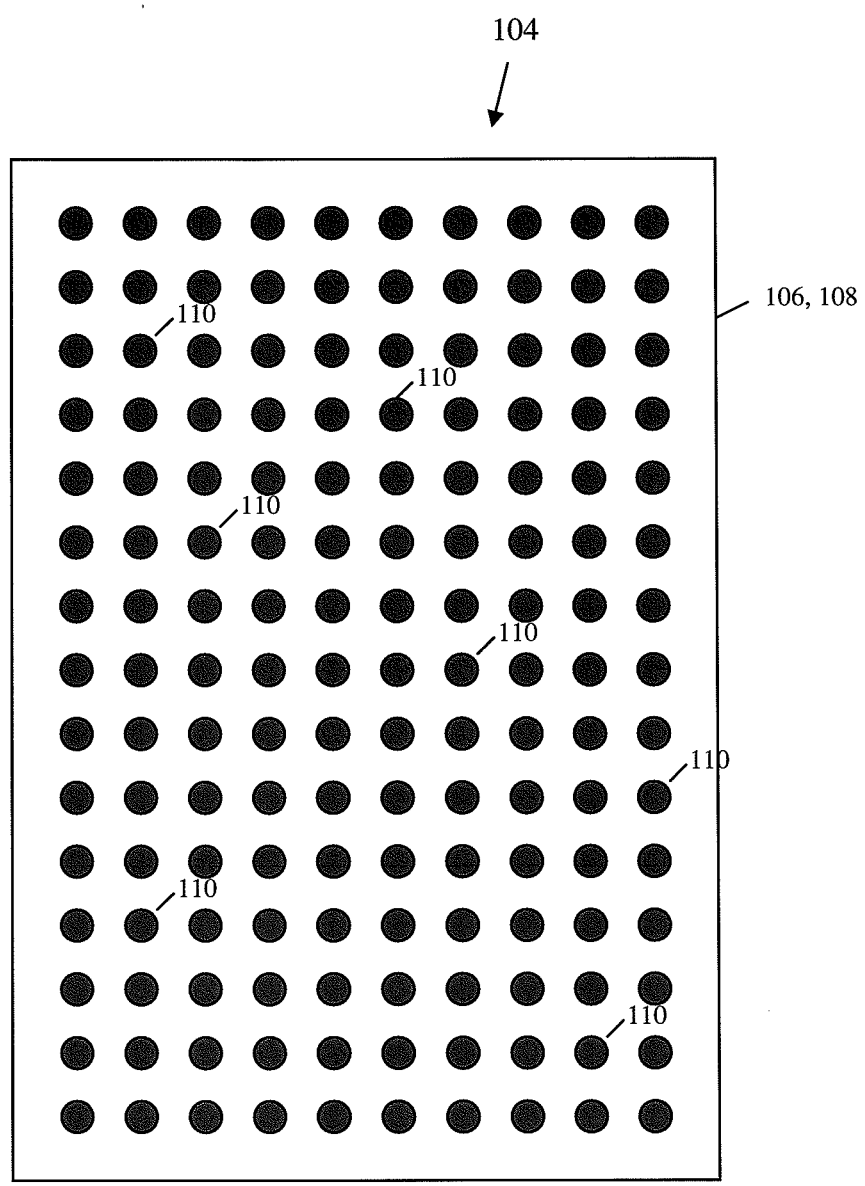
FIG. 6 is an exemplary layout of the temperature sensitive user interface associated with a touchcreen of the user computer device of FIG. 1 in accordance with an embodiment of the present invention.

Referring now to FIG. 6, an exemplary layout is depicted of temperature sensitive user interface 108 associated with touchcreen 104 in accordance with an embodiment of the present invention. Temperature sensitive user interface 108 includes a grid of multiple thermal energy emitter/detector devices 110 that are proximate to an inner surface of, or embedded in, touchscreen panel 106 and that are distributed across the touchscreen panel, coupled to processor 302, and controlled by touchscreen driver 306. Processor 302 then may determine a location of a touch based on thermal detections at various thermal energy emitter/detector devices 110 in the temperature sensitive user interface as described in greater detail above.

Figure 7:
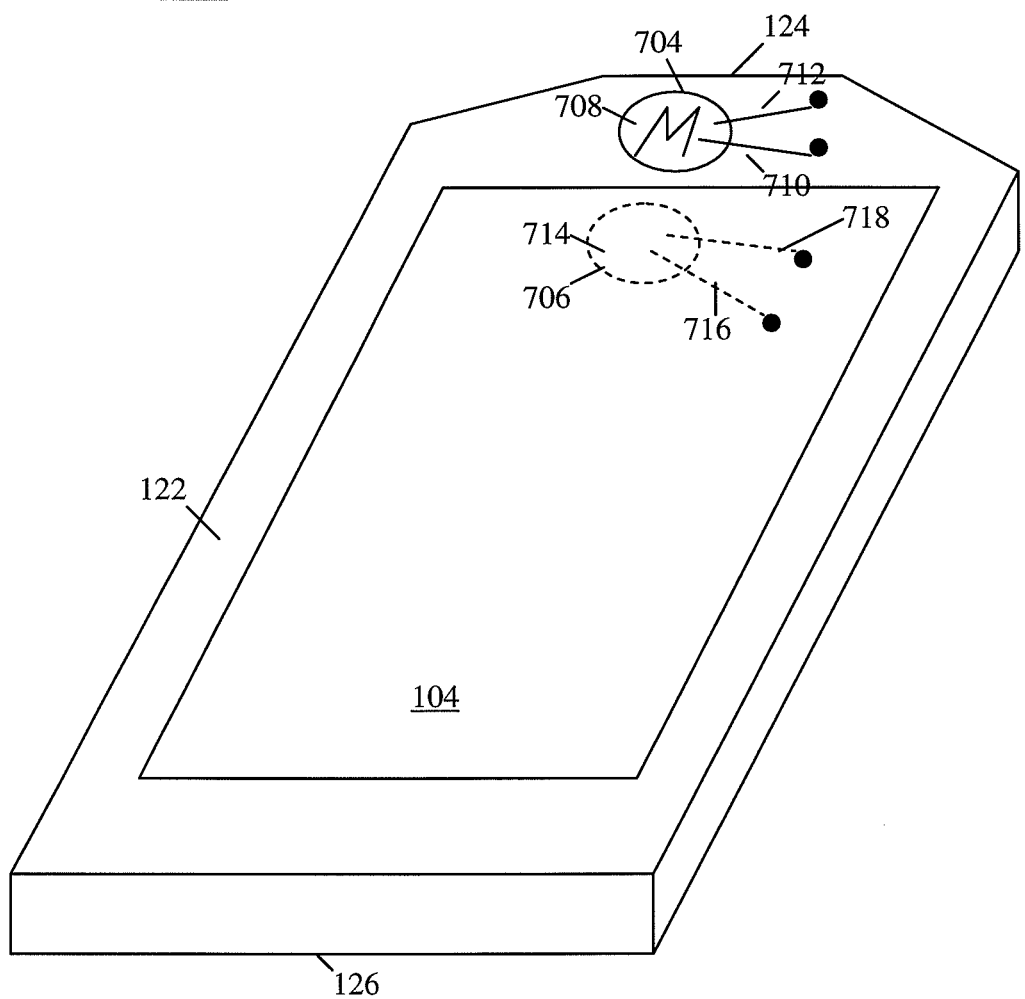
FIGS. 7 and 8 are front perspective views of two further exemplary layouts of the temperature sensitive user interface associated with the touchscreen of the user computer device of FIG. 1 in accordance with other embodiments of the present invention.

Referring now to FIGS. 6 and 7, several examples of arrangements and configurations of thermal energy emitter/detector devices in user computer device 102 are shown in accordance with other embodiments of the present invention. It is to be understood, however, that these additional embodiments (as well as the embodiment shown in FIG. 6) are merely examples of the present invention, and that the present invention is intended to encompass numerous other arrangements and configurations not shown as well as those that are shown.

As depicted in FIG. 7, in another embodiment of the present invention, user computer device 102 may include a front logo region 704 as well as a rear logo region 706 (shown in phantom) respectively on a front side 122 and a back side 126 of the user computer device. It is at (or, more particularly, around and beneath/inwardly of the front logo region 704 and the rear logo region 706, respectively, that front and rear thermal energy emitter/detector devices 110 (depicted in FIG. 7 as thermal energy emitter/detector devices 708 and 714, respectively) are placed. In the embodiment shown, each of the front temperature sensing device 708 and the rear temperature sensing device 714 (which is also shown in phantom) are looped structures that, as discussed in further detail below, in particular include thermocouple junctions that allow for temperature sensing to be accomplished. Given the positioning of the thermal energy emitter/detector devices 708, 714 adjacent to (underneath) the logo regions 704, 706, the respective thermal energy emitter/detector devices sense the temperatures along the logo regions due to thermal conduction through those regions. The use of large areas such as the logo regions 704, 706 coupled to the thermocouple junctions of the thermal energy emitter/detector devices 708, 714 can help to assure user contact with the thermal energy emitter/detector devices due to the logo large size.

First and second leads 710 and 712 of first temperature sensing device 708 can be considered analogous to leads 412 and 414, respectively, of FIG. 4, while leads 716 and 718 of the second temperature sensing device 714 can be considered analogous to the first and second leads 424 and 422, respectively, of FIG. 4. Thus, although further components such as the operational amplifier 456 of FIG. 4 are not shown in FIG. 7, it can be presumed that thermal energy emitter/detector devices 708 and 714 can be operated and provide signals that are utilized in the same or substantially the same manner as was described with respect to FIG. 4. Although the logo regions 704, 706 of user computer device 102 are shown to be positioned proximate an upper edge surface 124 of the user computer device, for example with the logo region 704 particularly being positioned in between the edge surface 124 and touchscreen 104 of the user computer device, it will be understood that the logo regions could be positioned at a variety of other locations along the front and back sides 122, 126 of the user computer device, as well as on other surfaces (for example, the surfaces of side edge 124 or other edge/side surfaces) of the mobile device.

Figure 8:
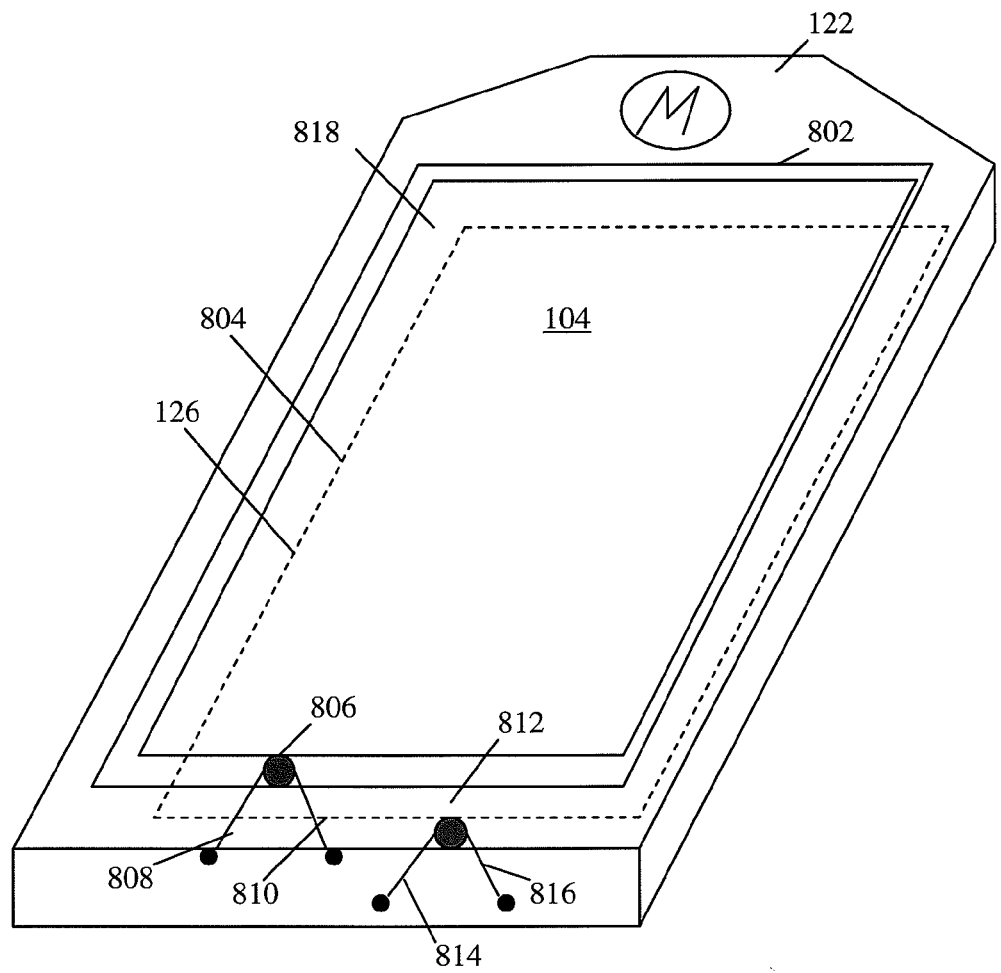

Referring now to FIG. 8, in still another embodiment of user computer device 102, the user computer device may include both a bezel 802 positioned along a front side 122 of user computer device 102 and a back plate 804 forming a surface of the back side 126 of the user computer device. As shown, bezel 802 is a rectangular-shaped structure having an open interior 818, that is, a shape similar to that of a picture frame. As depicted in FIG. 8, the user computer device includes at least a first and a second temperature sensing device 110 (depicted in FIG. 8 as thermal energy emitter/detector devices 806, 812, respectively) that are positioned proximate the front and back sides 122 and 126, respectively. As shown, the first temperature sensing device 806 is positioned adjacent to the bezel 802 along the interior side of the bezel. The second temperature sensing device 812 is positioned adjacent to the back plate 804 along the interior side of back plate 804. The bezel 802 and back plate 804 are heat conductive plates that are either directly exposed to the outside environment or embedded very close to the outer surface of the user computer device.

Each of thermal energy emitter/detector devices 806 and 812, as with the thermal energy emitter/detector devices 302 and 304, includes a junction allowing for temperature sensing and includes a respective first lead 808, 814 as well as a respective second lead 810, 816. As was the case with the temperature sensing device 302 and 304, the leads 808, 814 of the thermal energy emitter/detector devices can be understood to correspond to the leads 412 and 422 of FIG. 4, while the leads 810, 816 of the thermal energy emitter/detector devices can be understood to correspond to the leads 414 and 424 of FIG. 4. Thus, thermal energy emitter/detector devices 806 and 812 can be implemented in the same or substantially the same manner as discussed with reference to FIG. 4. Given the positioning of the first temperature sensing device 806 along the interior surface of the bezel 802, and given the positioning of the second temperature sensing device 812 along the interior surface of the back plate 804, each of those respective thermal energy emitter/detector devices senses the temperature of a respective location exterior to the phone along the bezel 802 and back plate 804, or radiates a temperature externally, by virtue of the conductive communication of heat through the bezel or the back plate, respectively. In the embodiments discussed above with respect to FIGS. 4, 7, and 8, user computer device 102 as depicted therein has two thermal energy emitter/detector devices. Nonetheless, in a preferred embodiment of the present invention, user computer device 102 may have any number of interconnected thermal energy emitter/detector devices 110. Indeed, depending upon the embodiment, user computer device 102 may have any arbitrary number of thermal energy emitter/detector devices 110 positioned on any one or more of the surfaces (and within any one or more regions along those surfaces), and those various thermal energy emitter/detector devices can be interconnected in any of a variety of manners.

Temperature sensitive user interface 108 of user computer device 102 can be used not only to detect a user input to the user computer device, that is, to detect a location of a user contact on a touchscreen such as touchscreen 104, but also to provide thermal feedback. By providing thermal feedback, a variety of applications for user computer device 102 may be possible through an exchange of thermal energy with another temperature sensing device. For example, by selectively heating one or more thermal energy emitter/detector devices 110 of the user computer device, thermal-based authentication of the user computer device may be performed, information may be thermally transferred by the user computer device to another user computer device or to a thermally activated material (such as a thermal paper), or a color of a phone skin may be dynamically changed using thermochromic films or other methods. Also, temperature sensitive user interface 108, and more particularly the thermal energy emitter/detector devices 110 of the temperature sensitive user interface, can sense external temperature and provide command to alter color of housing 120 to reflect the associated temperature.

Referring now to FIG. 9-13, a logic flow diagram 900 is provided that illustrates thermal generation and display of physical images by user computer device 102 and the thermal transfer of such images by the user computer device in accordance with various embodiments of the present invention. Logic flow diagram 900 begins (902) when processor 302 determines (904) a physical image to be thermally generated by temperature sensitive user interface 108 of user computer device 102 from among one or more physical images maintained in at least one memory device 304. For example, in various embodiments of the present invention, the physical image may comprise a pattern, such as the various patterns depicted in FIG. 10, may comprise a textual image, such as print characters of the signature depicted in FIG. 11, or may comprise a color change. In the event that user computer device 102 includes the layer of thermally sensitive film or ink 112, the physical image thermally generated on temperature sensitive user interface 108 also may be displayed in touchscreen 104 or housing 120 by the thermally sensitive film or ink.

In various embodiments of the present invention, the physical images may be pre-programmed into user computer device 102 or may be downloaded, wirelessly or over a wired connection, by the user computer device from a physical image source, such as a web-based server or another user computer device. In various embodiments of the present invention, the physical images may be transferred to, that is, received by, user computer device 102 from another user computer device, via touchscreen 104 and temperature sensitive user interface 108 of user computer device 102, as described below with respect to FIG. 14. In still other embodiments of the present invention, the physical images may be created on touchscreen 104 by a user of the user computer device and detected by temperature sensitive user interface 108 of the user computer device (for example, by taking a picture with a camera (not shown) by being sketched on touchscreen 104 by a user of the device). In response to receiving the physical image, the user computer device stores the received image in at least one memory device 304.

Processor 302 may determine which physical image to generate based on an instruction received from a user of the user computer device 102. For example, processor 302 may display, on touchscreen 104, a softkey that is associated with the stored physical images. By touching the softkey, the user inputs to the processor, and the processor receives from the user, an instruction to display the patterns stored by the at least one memory device 304. The instruction, that is, the user's touch of touchscreen 104, may be received via temperature sensitive user interface 108 or via touch-detecting non-temperature-based user interface 114. In response to receiving the instruction, processor 302 retrieves the physical images from the at least one memory device and displays the physical images on touchscreen 104. The user then may select a physical image by touching one of the displayed physical images, thereby inputting an instruction to the processor, via touch-detecting non-temperature-based user interface 114, or temperature sensitive user interface 108, to activate thermal energy emitter/detector devices 110 in temperature sensitive user interface 108 corresponding to the selected physical image.

In another embodiment of the present invention, processor 302 may determine a physical image to be thermally generated by temperature sensitive user interface 108 of user computer device 102 based on a user's touch of a physical image, such as an icon, displayed in the active visual display user interface 116 of by touchscreen 104, such as an LCD or an LED display technology. That is, as is known in the art, when the active visual display user interface 116 displays a physical image on touchscreen 104, processor 302 arranges for the image's display by arranging for illumination of appropriate image generating devices, for example, light emitting diodes or liquid crystals, that generate a predetermined image in a predetermined location on touchscreen 104, which image and location are maintained in at least one memory device 304. In turn, when a user touches such an image presented on the touchscreen, the user's touch of the image is relayed to the processor via touch-detecting non-temperature-based user interface 114 in accordance with well-known techniques.

In response to receiving an instruction to activate a particular pattern, processor 302 activates (906) thermal energy emitter/detector devices 110 corresponding to the determined image displayed in active visual display user interface 116. For example, processor 302 may selectively apply a current or voltage to thermal energy emitter/detector devices 110 corresponding to the determined physical image. In response to the application of the current, the selected thermal energy emitter/detector devices, that is, thermal energy emitter/detector devices 110 to which current or voltage is selectively applied, activate, that is, heat up, thereby producing (908) a corresponding thermal image in temperature sensitive user interface 108. The thermal image may or may not also be visually displayed on touchscreen 104 or housing 120, for example, by a color or shade change in areas of the layer of thermally sensitive film or ink 112 proximate to the activated thermal energy emitter/detector devices. That is, the activating of the thermal energy emitter/detector devices may cause a heating up of the thermally sensitive film or ink 112 proximate to the selected thermal energy emitter/detector devices, which in turn may cause a corresponding color or shade change in the heated up areas of the thermally sensitive film or layer of thermally sensitive ink, thereby generating a color change/physical image that corresponds to the heated up devices, which color change/physical image may appear on touchscreen 104 or in housing 120. For example, FIGS. 12 and 13 depict patterns that may appear on touchscreen 104 of user computer device 102 in response to processor 302 activating thermal energy emitter/detector devices corresponding to a physical image depicted in FIGS. 10 and 11, respectively.

Figure 9:
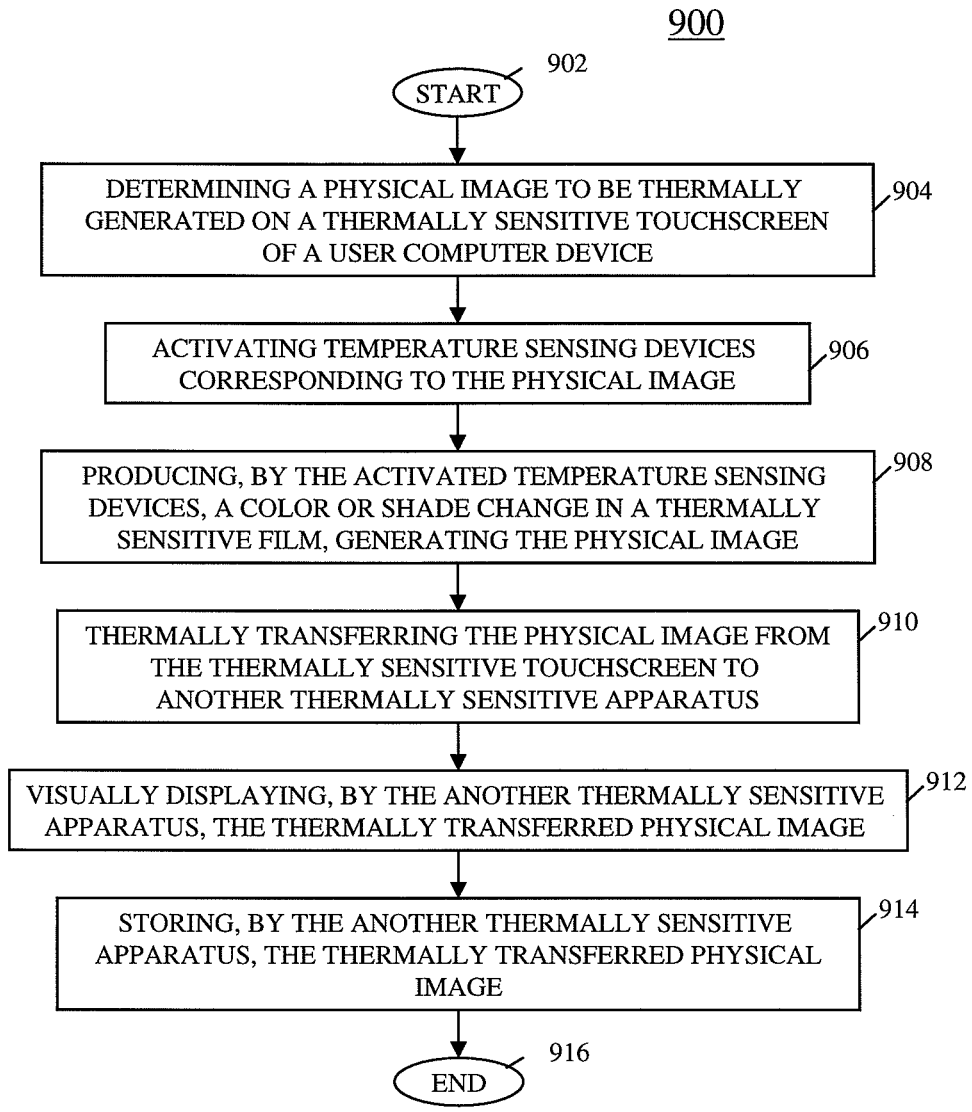
FIG. 9 is a logic flow diagram illustrating how physical images may be thermally generated and displayed on the temperature sensitive user interface of the user computer device of FIG. 1 in accordance with an embodiment of the present invention.
Figure 14:
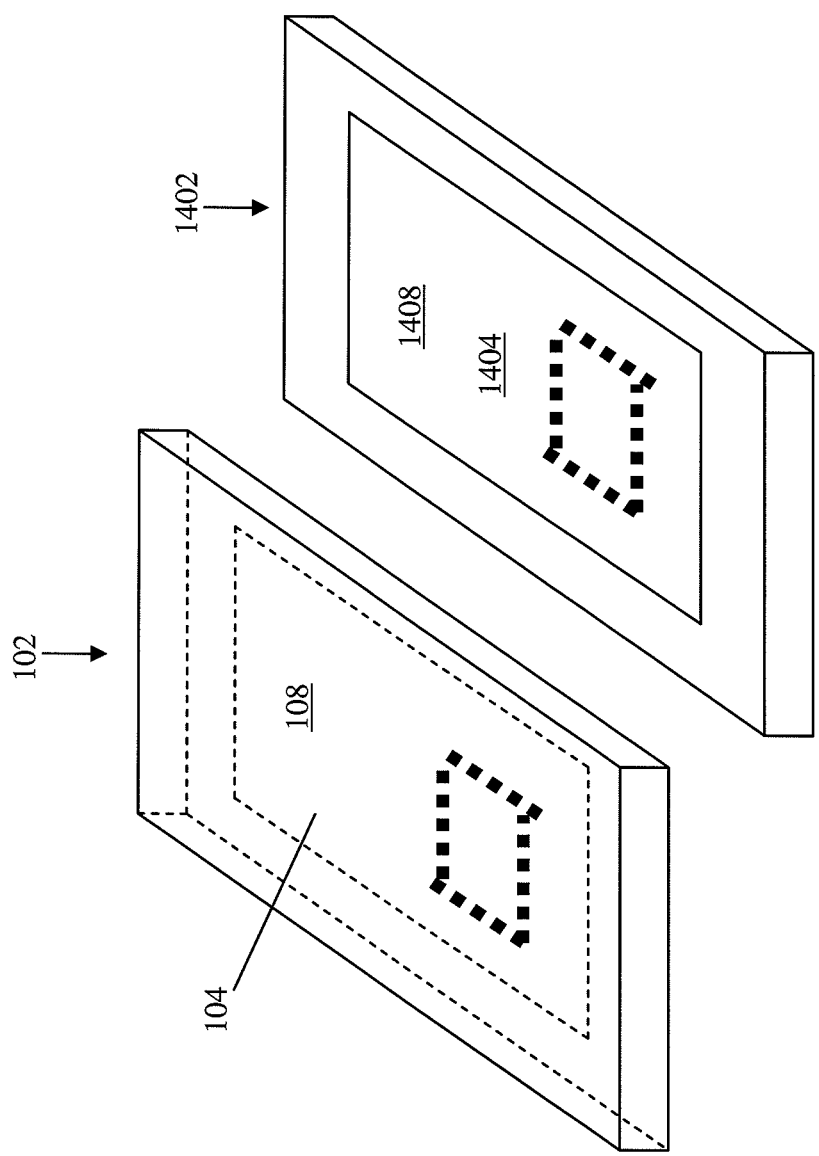
FIG. 14 is a block diagram depicting a thermal transfer of a thermally generated physical image from the temperature sensitive touchscreen of the user computer device of FIG. 1 to a temperature sensitive touchscreen of another user computer device in accordance with an embodiment of the present invention.

Further, and referring now to FIGS. 9 and 14, user computer device 102 then may thermally transfer (910) the generated physical image, such as one of the physical images depicted in FIGS. 10 and 11, to another thermally sensitive apparatus 1402, such as another user computer device similar to user computer device 102 and that includes a temperature sensitive touchscreen 1404 similar to touchscreen 104 and having a temperature sensitive user interface 1408 similar to temperature sensitive user interface 108 of touchscreen 104, a layer of thermally sensitive film or ink similar to the layer of thermally sensitive film or ink 112, and that may further include one or more of a touch-detecting non-temperature-based user interface (not shown), similar to touch-detecting non-temperature-based user interface 114, and an active visual display user interface (not shown), similar to active visual display user interface 116. More particularly, the user of user computer device 102 then may place touchscreen 104, which includes the thermally generated physical image, close enough to touchscreen 1404 that the heat generated by the activated thermal energy emitter/detector devices 110 of user of user computer device 102 and corresponding to the generated physical image is transferred to corresponding thermal energy emitter/detector devices of the temperature sensitive user interface 1408 of touchscreen 1404.

In response to detecting the heat, the thermal energy emitter/detector devices associated with touchscreen 1404 corresponding to the detected image activate, and thermally sensitive apparatus 1402 visually displays (912) the thermally transferred image on touchscreen 1404. In one such embodiment of the present invention, the activation of the thermal energy emitter/detector devices associated with touchscreen 1404 may produce a corresponding color or shade change in areas of a thermally sensitive film 112 of touchscreen 1404 proximate to the thermal energy emitter/detector devices, resulting in a display of the thermally transferred image on touchscreen 1404. In another such embodiment of the present invention, in response to detecting the activated thermal energy emitter/detector devices associated with the thermally transferred image and touchscreen 1404, the processor of thermally sensitive apparatus 1402 may display the thermally transferred image on the active visual display user interface of touchscreen 1404 in accordance with well known techniques. Further, the processor of thermally sensitive apparatus 1402 may store (914) the thermally transferred image, that is, stores data associated with the corresponding activated thermal energy emitter/detector devices of user computer device 1402, in an at least one memory device of user computer device 1402. Logic flow 900 then ends (916).

Figure 16:
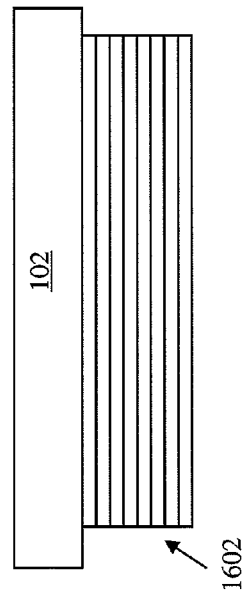
FIGS. 15 and 16 are block diagrams depicting a thermal transfer of an exemplary thermally generated physical image from the temperature sensitive touchscreen of the user computer device of FIG. 1 to temperature sensitive paper in accordance with an embodiment of the present invention.
Figure 15:
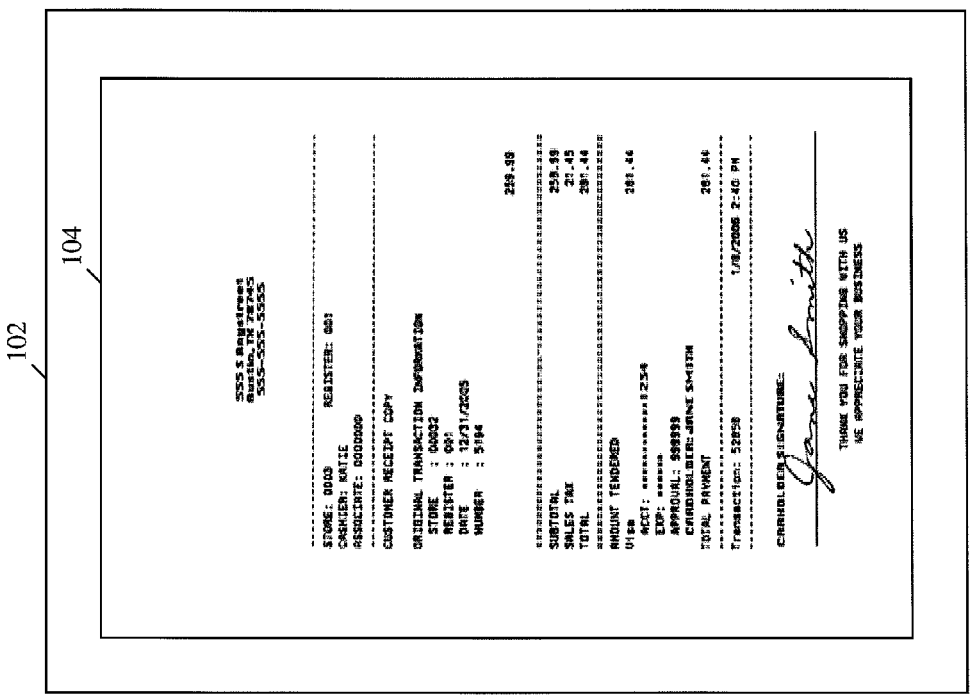

In other embodiments of the present invention, user computer device 102 may transfer a thermally generated physical image to any thermally sensitive apparatus. For example, and referring now to FIGS. 9, 15 and 16, the thermally generated physical image displayed on touchscreen 104 by user computer device 102 may comprise any type of information that may be desired to be transferred to another device or to thermally sensitive material 1602, such as thermally active paper. For example, the physical image to be transferred may be a textual pattern such as the receipt displayed on temperature sensitive user interface 108 of touchscreen 104 of user computer device 102 as depicted in FIG. 15. This textual pattern then may be transferred to another user computer device, as depicted in FIG. 14, or may be transferred to any thermally sensitive apparatus such as thermally active paper 1602 as depicted in FIG. 16, by placing touchscreen 104 of user computer device 102 close enough to thermally sensitive material 1602 that the heat generated by temperature sensitive user interface 108, and in particular by the activated thermal energy emitter/detector devices 110 of user computer device 102 and corresponding to the generated physical image, is transferred to the thermally sensitive material.

While FIG. 14 depicts user computer device 102 thermally transferring a thermal pattern to thermally sensitive apparatus 1402, one of ordinary skill in the art realizes that user computer device 102 and thermally sensitive apparatus 1402 each may act as a conveyor of a thermally generated pattern as well as a recipient of a thermally generated pattern. That is, the another thermally sensitive apparatus 1402, such as another user computer device, may, instead of or in addition to receiving a thermally generated pattern from user computer device 102, thermally convey to user computer device 102, and user computer device 102 may thermally receive from the another thermally sensitive apparatus, a thermal pattern as described above with reference to FIG. 9. For example, the another thermally sensitive apparatus 1402 may be a user computer device similar to user computer device 102 that generates a thermal pattern in temperature sensitive user interface 1408, or may be an electronic stamp that generates an electronic pattern having with a thermal imprint. User computer device 102 then receives the thermal pattern, for example, the stamp pattern with respect to an electronic stamp, via touchscreen 104 and temperature sensitive user interface 108 and processor 302 may process the thermal pattern and/or processor 302 may store the received thermal pattern in at least one memory device 304.

Figure 17:
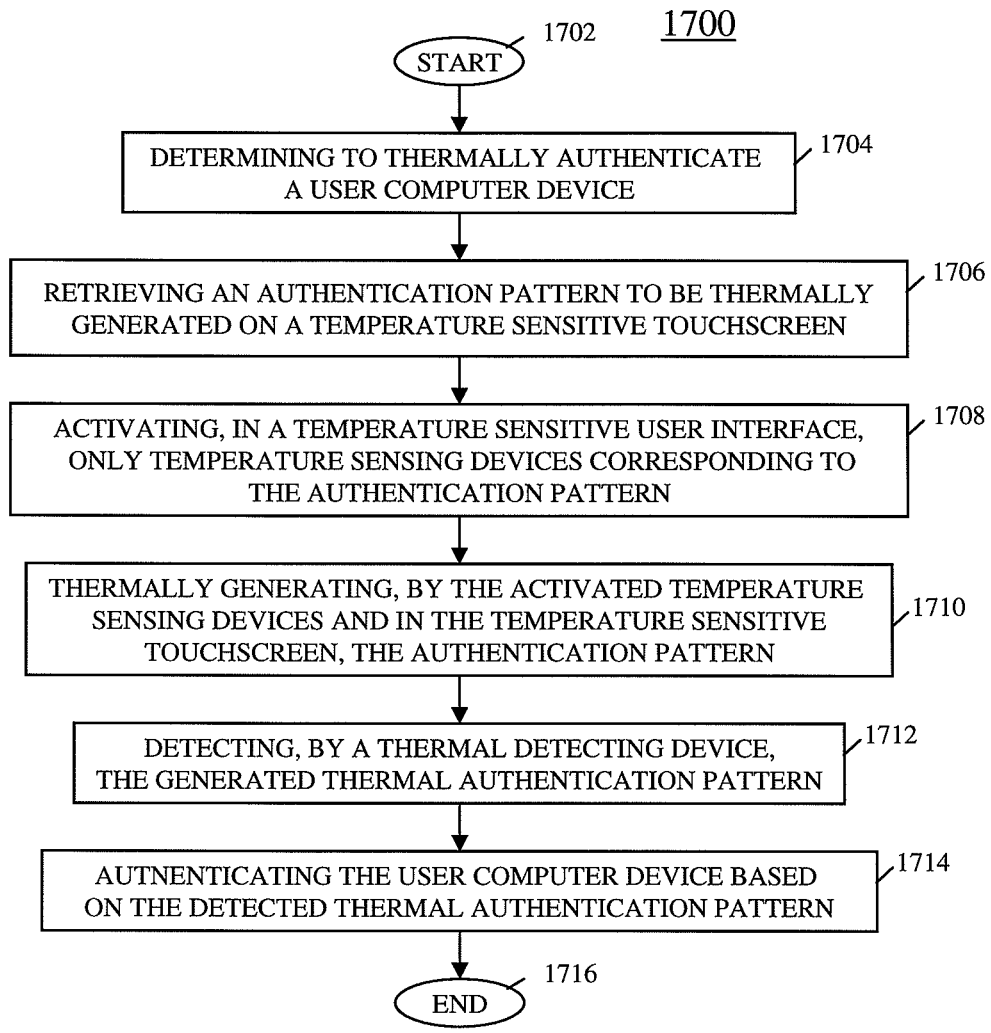
FIG. 17 is a logic flow diagram illustrating a thermal authentication by the user computer device of FIG. 1 in accordance with various embodiments of the present invention.
Figure 18:
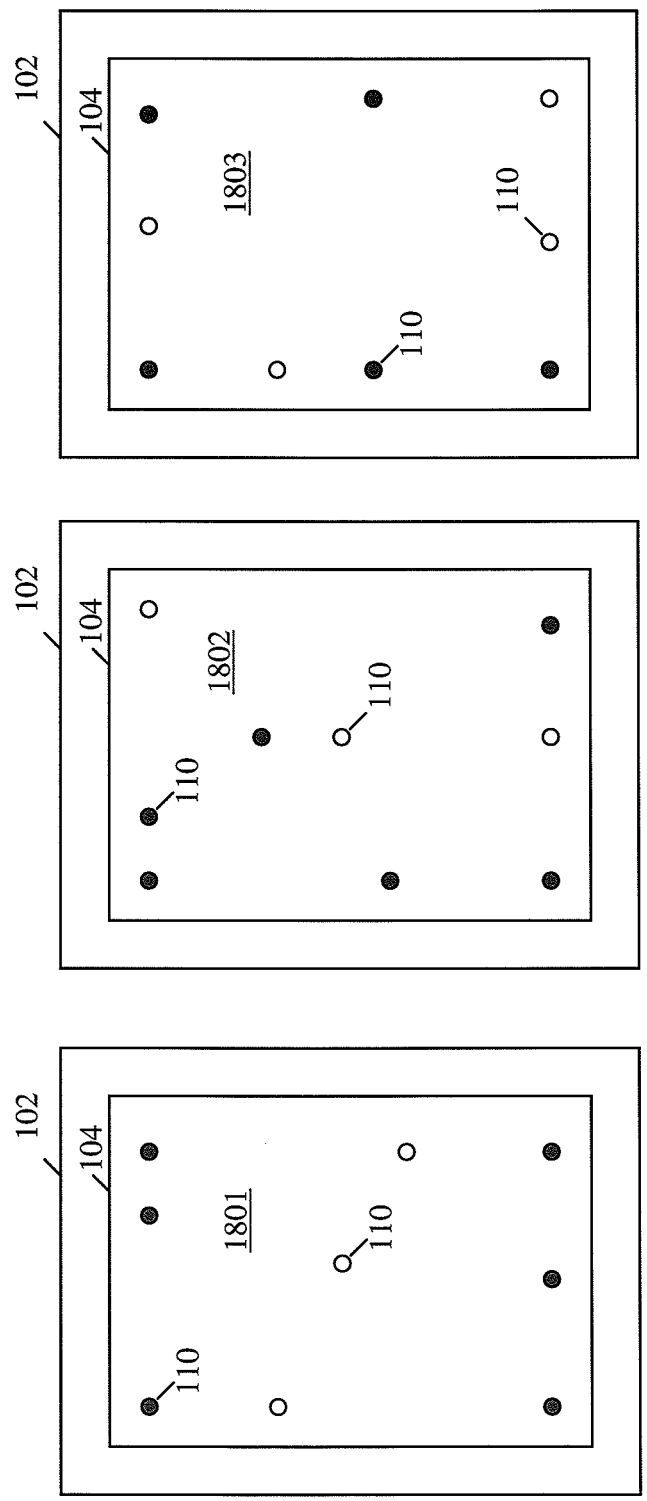
FIG. 18 is a block diagram illustrating multiple exemplary thermal authentication patterns that may be employed by the temperature sensitive user interface of the user computer device of FIG. 1 to perform thermal authentication in accordance with various embodiments of the present invention.

In yet other embodiments of the present invention, the thermally generated pattern that is generated by user computer device 102 may comprise authentication information that is used to authenticate the device. Referring now to FIGS. 17 and 18, a logic flow diagram 1700 is provided that illustrates a thermal authentication of user computer device 102 in accordance with various embodiments of the present invention.

Logic flow diagram 1700 begins (1702) when processor 302 of user computer device 102 determines (1704) to thermally authenticate user computer device 102. For example, a user of user computer device 102 may input an authentication instruction, for example, by touching a corresponding icon of touchscreen 104, or user computer device may self-determine to thermally authenticate itself based on a short-range (for example, Bluetooth, infra-red, near field communication (NFC), or thermally-generated) authentication request received from another electronic device or based on a context of the user computer device, for example, when the user computer device thermally detects a thermal energy detecting electronic device, such as detecting that it is docked in a thermal energy docking station as is described in greater detail below.

In response to determining to thermally authenticate user computer device 102, processor 302 of the user computer device generates an thermal authentication pattern by retrieving (1706), from at least one memory device 304 of the user computer device, an authentication pattern to be thermally generated on touchscreen 104 of user computer device 102 and selectively activating (1708), in temperature sensitive user interface 108, only the thermal energy emitter/detector devices 110 corresponding to the retrieved authentication pattern. For example, processor 302 may selectively apply a current or a voltage to thermal energy emitter/detector devices 110 corresponding to the thermal authentication pattern. In response to the application of the current or voltage, the thermal energy emitter/detector devices 110 to which current or voltage is applied activate, that is, heat up, to generate (1710) the thermal authentication pattern, which then may be read (1712) by a thermal detecting device, such as another user computer device with a temperature sensitive touchscreen or any other kind of electronic device known to one of ordinary skill in the art that is capable of detecting a thermal pattern.

The thermal detecting device then authenticates (1714) user computer device 102 based on a recognition of the thermal authentication pattern, and logic flow 1700 then ends (1716). For example, the thermal detecting device may maintain, in an at least one memory device of the thermal detecting device, thermal authentication patterns for all devices that have been properly registered with the thermal detecting device. When the thermal detecting device, that is, a processor of the thermal detecting device, reads the thermal authentication pattern generated by user computer device 102, the processor of the thermal detecting device compares the read thermal authentication pattern to the thermal authentication patterns maintained in the at least one memory device of the thermal detecting device. When the read thermal authentication pattern matches one of the maintained thermal authentication patterns, the thermal detecting device authenticates the user computer device.

For example, and referring now to FIG. 18, block diagrams are provided that illustrate multiple exemplary thermal authentication patterns 1801-1803 that may be maintained in the thermal detecting device and the at least one memory device 304 of user computer device 102. As depicted in FIG. 18, each authentication pattern 1801-1803 comprises nine activated thermal energy emitter/detector devices 110 that are indicated by circles in touchscreen 104 of user computer device 102; however, one of ordinary skill in the art realizes that a thermal authentication pattern may comprise any number of activated thermal energy emitter/detector devices 110.

In another embodiment of the present invention, each thermal authentication pattern 1801-1803 may comprise activated thermal energy emitter/detector devices 110 of multiple different temperatures, for example, a first, higher temperature indicated by the shaded thermal energy emitter/detector devices 110 of each thermal authentication patterns 1801-1803 and a second, lower temperature indicated by the unshaded thermal energy emitter/detector devices 110 of thermal authentication patterns 1801-1803. In one such embodiment, such different temperature levels may be achieved by supplying different levels of current to the activated thermal energy emitter/detector devices 110, wherein a larger current results in a higher temperature temperature sensing device. While each pattern depicted in FIG. 18 illustrates one or two temperature levels, one of ordinary skill in the art realizes that more than two temperature levels may be employed in a thermal authentication pattern.

In various other embodiments of the present invention, the thermal authentication pattern generated by processor 302 may vary on a time scale. For example, in one such embodiment and referring again to FIG. 18, processor 302 may activate one or more, but fewer than all, of the thermal energy emitter/detector devices 110 that are included in a pattern at any given time. For example, processor 302 may activate a first one or more thermal energy emitter/detector devices 110 of thermal authentication pattern 1801 during a first time period, a second one or more thermal energy emitter/detector devices 110 of the pattern during a second time period, wherein the first one or more thermal energy emitter/detector devices may be different from the second one or more thermal energy emitter/detector devices, a third one or more thermal energy emitter/detector devices 110 of the pattern during a third time period, wherein the third one or more thermal energy emitter/detector devices may be different from the first and second one or more thermal energy emitter/detector devices, and so on.

In another such embodiment, processor 302 may, instead of or in addition to the embodiment described above, activate a different number of thermal energy emitter/detector devices of thermal authentication pattern 1801 in each of multiple successive time periods. For example, processor 302 may activate a first number of thermal energy emitter/detector devices 110, for example, two, of thermal authentication pattern 1801 in a first time period 't$_1$,' activate a second number of thermal energy emitter/detector devices 110, for example, three, of thermal authentication pattern 1801 in a second time period 't$_2$,' and activate a third number of temperature sensing device 110, for example, one, of thermal authentication pattern 1801 in a third time period 't$_3$,' which two, three, and one thermal energy emitter/detector devices may or may not include one or more of the same thermal energy emitter/detector devices. In another such embodiment, processor 302 may generate a different thermal authentication pattern in each of multiple successive time periods, for example, generating thermal authentication pattern 1801 at first time period 't$_1$,' generating thermal authentication pattern 1802 at second time period 't$_2$,' and generating thermal authentication pattern 1803 at third time period 't$_3$.'

In still other embodiments of the present invention, the thermal authentication pattern generated by processor 302 may be based on an operating context or external context of user computer device 102, such as a purpose to which the device is being used or a location of the user computer device. In one such embodiment, the particular thermal authentication pattern, such as patterns 1801-1803, retrieved and generated by processor 302 may be based on a determination, by the processor, of an external context of the device, such as a determination, by the processor, of the user computer device's geographic location by reference to location determination module 316 or a receipt of short range signals, such as Bluetooth or infra-red signals, by the user computer device. In another such embodiment, the thermal authentication pattern generated by processor 302 may be based on a determination, by the processor, of an application selected by a user of the user computer device as is known in the art. Processor 302 then may generate different thermal authentication patterns at different locations or in association with execution of different applications or in association with a different user logged into the device.

By generating thermal patterns that may be thermally recognized by other electronic devices, user computer device 102 is able to provide for thermal pattern transfer, thereby provide for thermal recognition by other devices and providing thermal authentication, among other uses for thermal pattern recognition. Thus user computer device 102 is able to operate in contexts and operating conditions where the capabilities of user computer devices, such as a smart phone or a tablet computer, that have a touchscreen that is not a temperature sensitive touchscreen, are severely restricted, such as a winter environment when a user is outdoors and wearing gloves. Furthermore, by generating a thermal pattern that may be thermally recognized by another electronic device, user computer device 102 is able to transfer that pattern merely by placing the touchscreen of the user computer device against a temperature sensitive touchscreen of another electronic device, thereby facilitating thermal transfer of information for a variety of consumer purposes, such as purchase payments, providing a copy of a consumer purchase receipt (for example, a street vendor or a farmer's market vendor will not have to provide paper receipts), coupon exchange, picture exchange, or using the user computer device as an electronic stamp.

In addition, by generating thermal patterns, user computer device 102 may operate as a 'mood' sensor, changing colors (by use of the layer of thermally sensitive film or ink 112 proximate to activated thermal energy emitter/detector devices) of touchscreen 104 (for example, a background displayed on touchscreen 104) or housing 120 based on a detected user or ambient temperature, and may even provide for color displays on touchscreen 104 that are activated and altered by sensed temperatures.

As a context-aware device, user computer device 102 also includes the capability of thermally detecting and recognizing an electronic accessory external to the user computer device, such as a user computer device docking station, and automatically making adjustments to user interface 308 and to execute applications in response to detecting the docking station. In particular, user computer device 102 is able to use the thermal energy emitter/detector devices 110 of temperature sensitive user interface 108 to identify the accessory and/or accessory type, such as a docking station and/or a docking station-type, and in response, activate one or more applications and/or retrieve and display user-preferred settings associated with the identified accessory. Other user interface 308 settings, such as display brightness, touchscreen sensitivity, sound volume, feature on/off, wireless connectivity, and so on, also may be adapted based on the identity of the docking station.

Figure 19:
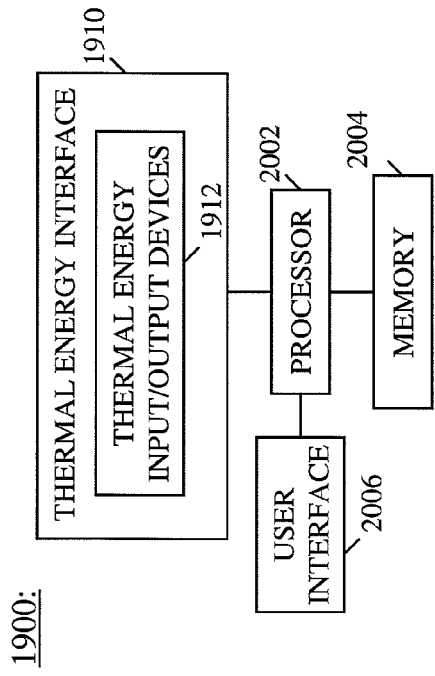
FIG. 19 is a front perspective view of a thermal energy docking station in accordance with an embodiment of the present invention.

Referring now to FIGS. 19-28, use of user computer device 102 in cooperation with a docking station is depicted in accordance with various embodiments of the present invention. While FIGS. 19-28 depict user computer device 102 interfacing with, that is, operating in cooperation with, a docking station, the docking station is provided as an example of any of multiple external electronic accessory devices, such as an email reader, a music player, a video player, a video game controller or a video game console, a social networking device, or any other electronic device that may occur to one skilled in the art that may thermally communicate with the user computer device. Referring first to FIG. 19, a front perspective view of a thermal energy docking station 1900 is depicted in accordance with an embodiment of the present invention. Thermal energy docking station 1900 includes a thermal energy interface 1910 that is configured to exchange thermal energy with a user computer device, such as user computer device 102, and more particularly that includes one or more thermal energy modules 1912 (three shown) that each may emit thermal energy that can be detected by the user computer device and/or may detect thermal energy emitted by the user computer device, for example, a thermal energy pattern generated by the thermal energy emitter/detector devices 110 of the user computer device. Each thermal energy module 1912 comprises one or more thermal energy emitter/detector devices 1914 that generate and emit, and/or detect, thermal energy that respectively can be sensed by, or generated by, thermal energy emitter/detector devices 110 of temperature sensitive user interface 108 of user computer device 102 (which temperature sensitive user interface, again, may be located near any external surface of the user computer device (for example, front side, back side, or sides of the device)). While FIG. 19 depicts four thermal energy emitter/detector devices 1914 per thermal energy generating module 1912, one of ordinary skill in the art realizes that, depending upon the embodiment, each thermal energy module 1912 can include any arbitrary number of thermal energy emitter/detector devices 1914. By detecting the thermal energy output by the one or more thermal energy output devices 1914, user computer device 102 can determine that it is docked in docking station 1900 and further may detect a docking station-type and docking station functionality, and trigger execution of a specific application, such as a specific user interface display (UI), adjustment of a user computer device operational context, such as adjusting a brightness, adjusting a volume, turning features on/off, and so on, or establishment of a wireless connectivity with the external electronic accessory device via a short-range wireless protocol, such as the Bluetooth protocol or a Wireless Local Area Network (WLAN) protocol that operates in accordance with the IEEE (Institute of Electrical and Electronics Engineers) 802.xx standards, for example, the 802.11 or 802.16 standards.

The thermal energy modules 1912 may be distributed around thermal energy docking station 1900 in any manner so long as they are proximate to, and their generated thermal energy can be detected by, the thermal energy emitter/detector devices 110 of temperature sensitive user interface 108 of user computer device 102. For example, as depicted in FIG. 19, thermal energy docking station 1900 comprises a bed in which user computer device 102 may be placed, that is, docked, which bed includes a bottom side 1904 atop a base 1902 of the docking station, two side walls 1906, and a back side 1908. FIG. 19 further depicts multiple thermal energy generating modules 1912 (three shown) distributed across an inner side of the back 1908 of the bed of the thermal energy docking station. However, in other embodiments of the present invention, the thermal energy modules 1912 may be located anywhere in the bed of thermal energy docking station 1900, so long as the locations of the thermal energy modules 1912 are proximate to, and can be sensed by, thermal energy emitter/detector devices 110 of temperature sensitive user interface 108 of user computer device 102. The docking station's thermal energy emitter/detector devices 1914 not only generate recognition patterns and other information, but also may sense recognition patterns and other information from the user computer device, for example, generated by the temperature sensitive user interface 108 of the user computer device. Thus, the user computer device can provide instructions to the docking station (or accessory device) and vice versa.

Figure 20:
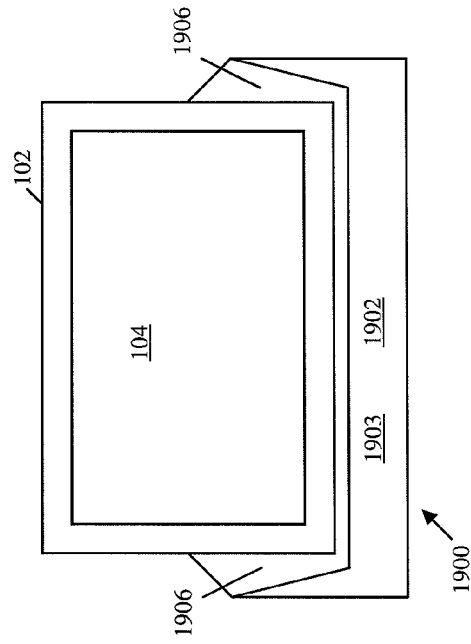
FIG. 20 is a block diagram of the thermal energy docking station of FIG. 19 in accordance with an embodiment of the present invention.

FIG. 20 is a block diagram of thermal energy docking station 1900 in accordance with an embodiment of the present invention. Thermal energy docking station 1900 includes a processor 2002 such as one or more microprocessors, microcontrollers, digital signal processors (DSPs), combinations thereof or such other devices known to those having ordinary skill in the art. The particular operations/functions of processor 2002, and respectively thus of thermal energy docking station 1900, are determined by an execution of software instructions and routines that are stored in a respective at least one memory device 2004 associated with the processor, such as random access memory (RAM), dynamic random access memory (DRAM), and/or read only memory (ROM) or equivalents thereof, that store data and programs that may be executed by the corresponding processor. For example, at least one memory device 2004 maintains a list of multiple applications that may be executed by a user computer device that can be docked in the thermal energy docking station, such as applications that may be stored in the at least one memory device 304 of, and executed by processor 302 of, user computer device 102, for example, a calendar application, a navigational application, an email application, a music application, a video application, a video game application, and a social network application. The at least one memory device 2004 further maintains, in association with each such application, a thermal pattern that identifies the application, which thermal identification patterns also are maintained, in association with each such application, in the at least one memory device of the dockable user computer device, that is, user computer device 102.

One of ordinary skill in the art realizes that the operations/functions of processor 2002 alternatively may be implemented in hardware, for example, integrated circuits (ICs), application specific integrated circuits (ASICs), a programmable logic device such as a PLD, PLA, FPGA or PAL, and the like, implemented in the user computer device. Based on the present disclosure, one skilled in the art will be readily capable of producing and implementing such software and/or hardware without undo experimentation. Unless otherwise indicated, the functions described herein as being performed by thermal energy docking station 1900 are performed by processor 2002.

Thermal energy docking station 1900 further includes thermal energy interface 1910, having multiple thermal energy emitter/detector devices 1914, in communication with processor 2002. Each thermal energy emitter/detector device 1914 may be any type of device that emits thermal energy when an electrical current is applied to the device and/or a voltage differential is applied across the device, or in other embodiments detects thermal energy emitted by an external thermal energy source, such as user computer device 102. For example, each thermal energy emitter/detector device 1914 may comprise a resistor or a capacitor that output thermal energy in response to application of a current or a voltage differential, or may comprise a thermocouple, such as a thermocouple formed by a respective junction of first and second types of materials such as a Indium Tin Oxide ($InSnO_4$) ceramic material (ITO) and a Indium Tin Oxide Manganese ceramic material (ITO:Mn), that may emit or detect thermal energy. Generally, the greater the number of thermal energy emitter/detector devices 1914 included in a thermal energy generating module 1912, the greater the amount of thermal energy that may be generated by the module. Furthermore, by including multiple thermal energy emitter/detector devices 1914 in a thermal energy generating module 1912 and/or by including multiple thermal energy generating modules 1912 in docking station 1900, a variety of thermal energy patterns may be generated by the docking station, which allows user computer device 102 to detect a wider range of docking station types and docking station functions as well as to authenticate docking stations in order to access docking station functions.

Thermal energy docking station 1900 further includes a user interface 2006 that allows a user to interact with the docking station, for example, to input instructions into the docking station and to receive information from the docking station. For example, and referring now to FIGS. 21 and 22, user interface 2006 may include a display screen 2102, for example, included in a front side 1903, an outside of a side wall 1906, or the back side 1908 of the docking station (depicted, in FIG. 21, as included in the back side 1908), for displaying information generated by processor 2002, and may further include a mechanical control 2104, such as a knob, lever or any other type of mechanical device that allows a user to input instructions into thermal energy docking station 1900. For example, when mechanical control 2104 comprises a knob, the user of the docking station can, by turning the knob, instruct the docking station to switch applications being implemented by the docking station. In turn, the application currently being implemented, and/or an application or menu of applications available for selection by the user of the docking station when operating mechanical control 2104, may be indentified on display screen 2102. Display screen 2102 may be a liquid crystal display (LCD), a light emitting diode (LED) display, a plasma display, or any other means for visually displaying information, and further may be a touch-screen via which a user may input instructions into thermal energy docking station 1900. In addition, it can also be just control buttons w/o display.

Thermal energy docking station 1900 also includes a power source (not shown), such as a power converter that may be connected to a power outlet or a limited life power supply, such as a removable and/or rechargeable battery, for providing power to the other components of the thermal energy docking station.

Figure 23:
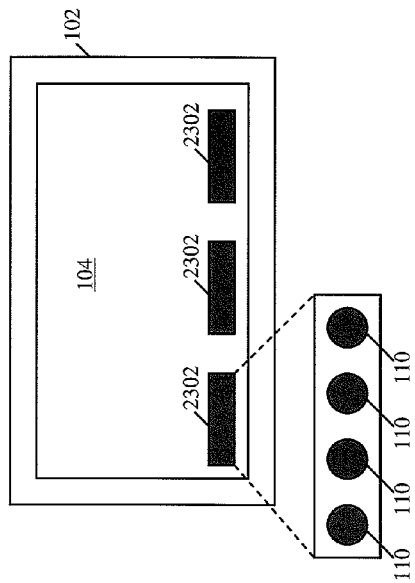
FIGS. 23 to 26 are block diagrams of the user computer device of FIG. 1 that illustrate exemplary distributions of multiple temperature sensing regions of the temperature sensitive user interface of the user computer device in accordance with various embodiments of the present invention.
Figure 26:
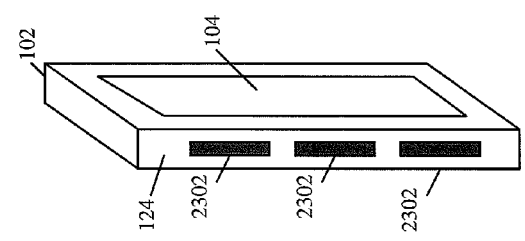
Figure 25:
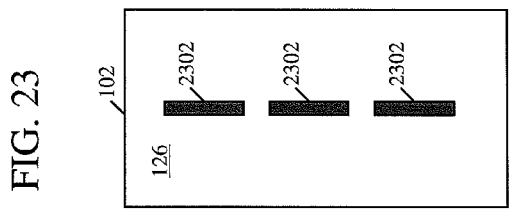
Figure 24:
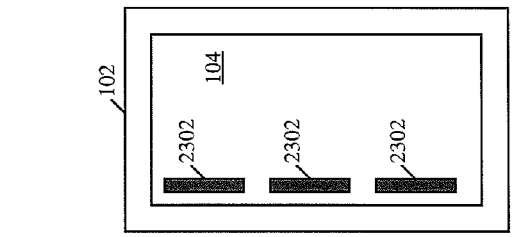

Referring now to FIG. 23-26, block diagrams of user computer device 102 are depicted that illustrate exemplary distributions of multiple temperature sensing regions 2202 (three shown) of temperature sensitive user interface 108 of user computer device 102 in accordance with various embodiments of the present invention. As depicted in FIG. 23, each temperature sensing region of the multiple temperature sensing regions 2302 comprises one or more thermal energy emitter/detector devices 110 (four shown). Temperature sensing regions 2302 may be distributed anywhere on user computer device 102. For example and referring now to FIGS. 24-26, in various exemplary embodiments of the present invention the temperature sensing regions 2302 may be distributed across front side 122 of the user computer device, for example, across touchscreen 104 as depicted in FIG. 24, or the temperature sensing regions 2302 may be distributed across back side 126 of the user computer device as depicted in FIG. 25, or the temperature sensing regions 2302 may be distributed across any side edge 124 of the user computer device as depicted in FIG. 26. Regardless of the locations of the temperature sensing regions 2302 of temperature sensitive user interface 108 of user computer device 102, so long as the locations are proximate to, and can sense the thermal energy generated by, the thermal energy generating modules 1912 of thermal energy docking station 1900, user computer device 102 may detect thermal energy patterns generated by the docking station and process the detected patterns.

Figure 21:
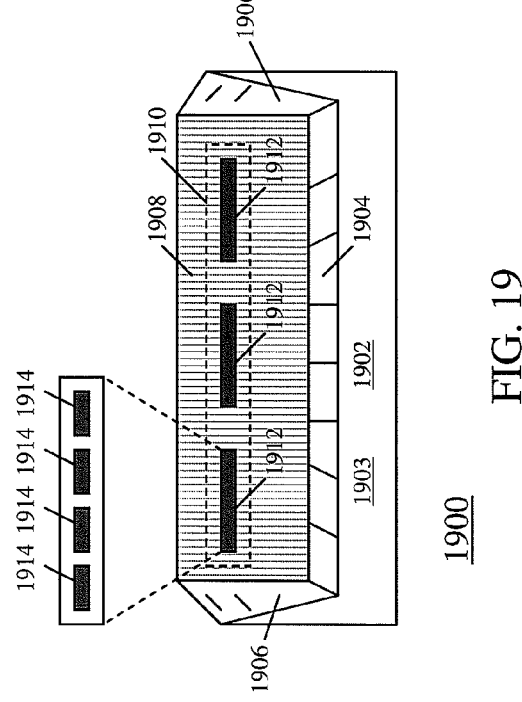
FIG. 21 is an exemplary rear perspective view of the user computer device of FIG. 1 docked in the thermal energy docking station of FIG. 19 in accordance with an embodiment of the present invention.
Figure 22:
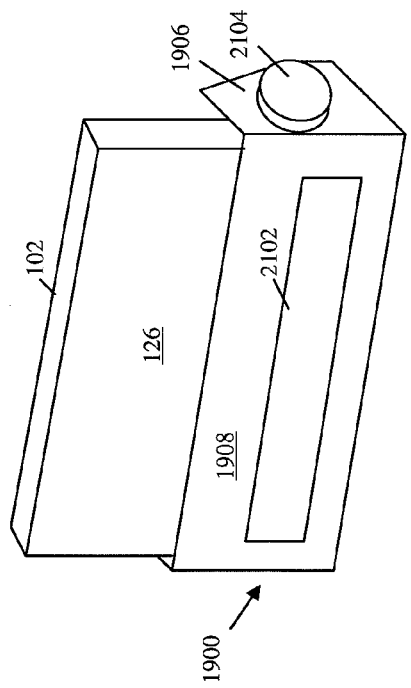
FIG. 22 is an exemplary front perspective view of the user computer device of FIG. 1 docked in the thermal energy docking station of FIG. 19 in accordance with an embodiment of the present invention.

For example, and referring again to FIGS. 21 and 22, block diagrams are provided illustrating an exemplary placement of user computer device 102 in the bed of thermal energy docking station 1900. More specifically, FIG. 21 is an exemplary rear perspective view of user computer device 102 docked in thermal energy docking station 1900, and FIG. 22 is an exemplary front perspective view of the user computer device docked in the thermal energy docking station. When the thermal energy generating modules 1912 of thermal energy docking station 1900 are distributed across the inner side of the back 1908 of the bed of the thermal energy docking station, as depicted in FIG. 19, it may be preferable that the temperature sensing regions 2302 of user computer device 102 be similarly distributed across back side 126 of the user computer device, for example, as depicted in FIG. 25. By way of another example, when the thermal energy generating modules 1912 of thermal energy docking station 1900 are distributed across the bottom side 1904 of the bed of the thermal energy docking station, it may be preferable that the temperature sensing regions 2302 of user computer device 102 be similarly distributed across a side edge 124 of the user computer device, for example, as depicted in FIG. 26.

Figure 27:
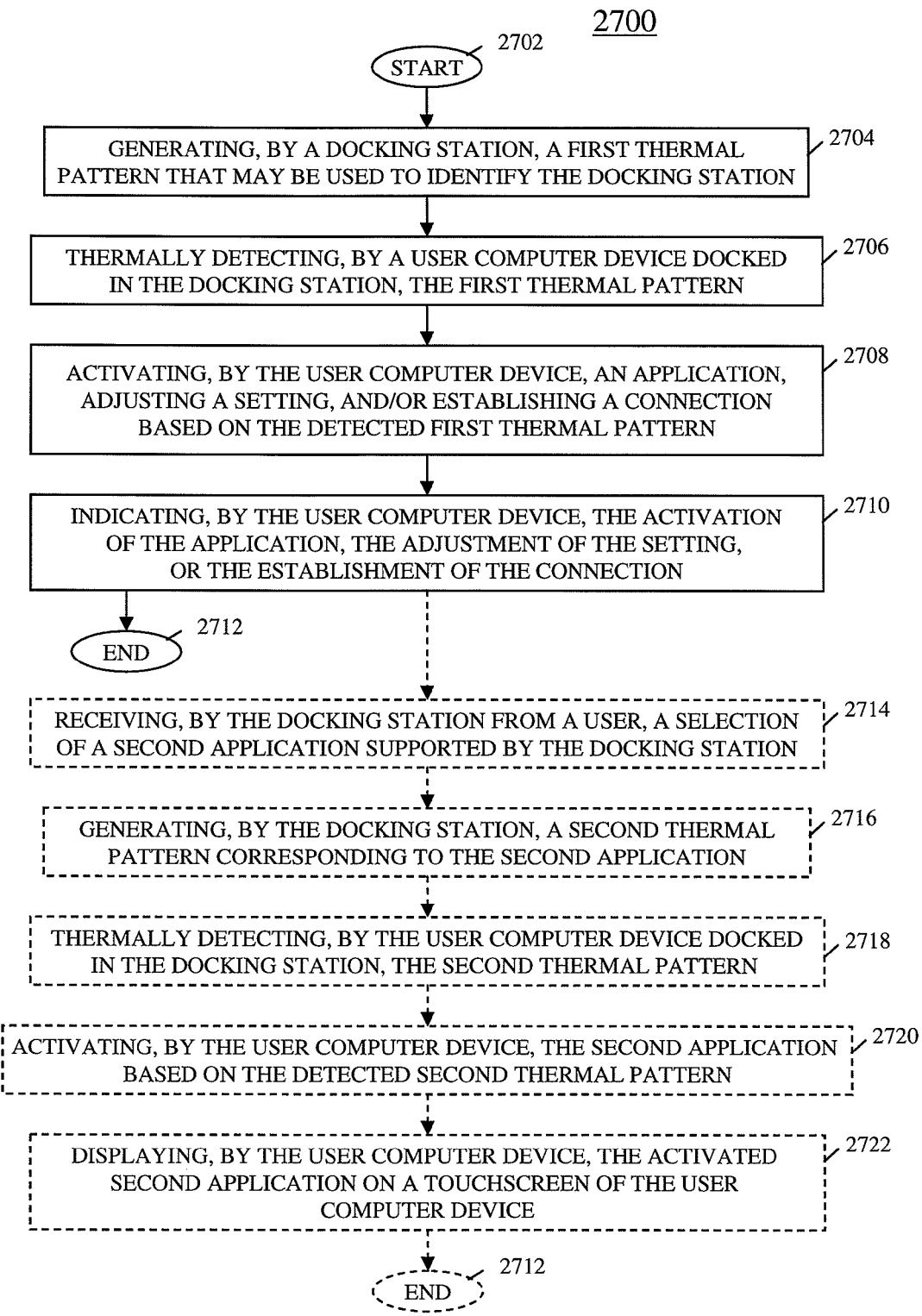
FIG. 27 is a logic flow diagram illustrating thermal recognition of a docking station and user interface setting and control by the user computer device of FIG. 1 in accordance with various embodiments of the present invention.

Referring now to FIG. 27, a logic flow diagram 2700 is provided that illustrates a thermal recognition of thermal energy docking station 1900, and a setting and control of user interface 308, by user computer device 102 in accordance with various embodiments of the present invention. Logic flow diagram 2700 begins (2702) when thermal energy docking station 1900 generates (2704) a first thermal pattern, that is, a thermal pattern that may be used to thermally identify the docking station. More particular, based on instructions and a thermal pattern maintained in at least one memory device 2004 of thermal energy docking station 1900, processor 2002 activates one or more thermal energy output devices 1914 to generate the first thermal pattern. When docked in thermal energy docking station 1900, user computer device 102, that is, processor 302 via temperature sensitive user interface 108 of the user computer device, thermally detects (2706) thermal energy docking station 1900 by detecting the first thermal pattern. More particularly, the thermal energy emitter/detector devices 110 of temperature sensitive user interface 108 of user computer device 102 detect the thermal pattern generated by the thermal energy emitter/detector devices 1914 of the thermal energy docking station.

Figure 28:
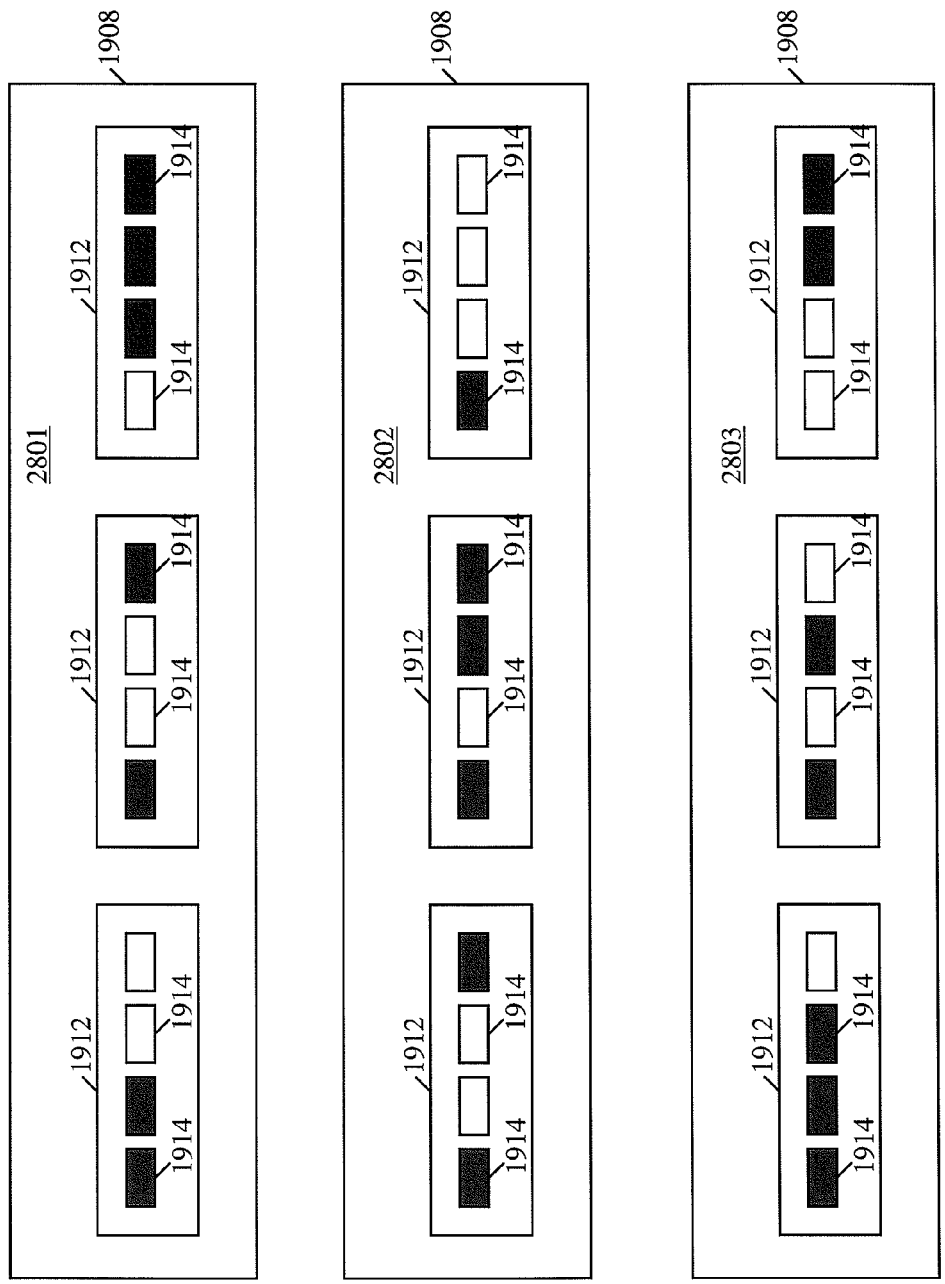
FIG. 28 is a block diagram illustrating multiple exemplary thermal patterns that may be employed by the thermal energy docking station of FIG. 19 in accordance with various embodiments of the present invention.

For example, and referring now to FIG. 28, a block diagram is provided that illustrates multiple exemplary thermal patterns 2801-2803 that may be maintained in at least one memory device 2004 and generated by thermal energy docking station 1900, wherein each thermal pattern 2801-2803 comprises twelve activated thermal energy output devices 1914. While six or seven activated thermal energy emitter/detector devices 1914 (indicated by the shaded thermal energy output devices) are depicted in each thermal pattern 2801-2803 shown in FIG. 28, one of ordinary skill in the art realizes that a thermal pattern may comprise any number of activated thermal energy emitter/detector devices 1914. In another embodiment of the present invention, each thermal pattern 2801-2803 may comprise activated thermal energy emitter/detector devices 1914 of multiple different temperatures, for example, a first, higher temperature indicated by the shaded thermal energy emitter/detector devices 1914 of each thermal patterns 2801-2803 and a second, lower temperature indicated by the unshaded thermal energy emitter/detector devices 1914 of thermal patterns 2801-2803. In one such embodiment, such different temperature levels may be achieved by supplying different levels of current to the thermal energy emitter/detector devices 1914, wherein a larger current results in a higher temperature thermal energy emitter/detector device. While each pattern depicted in FIG. 28 illustrates one or two temperature levels, one of one of ordinary skill in the art realizes that more than two temperature levels may be employed in a thermal pattern.

In various other embodiments of the present invention, the thermal pattern generated by processor 2002 may vary on a time scale. For example, in one such embodiment and referring again to FIG. 28, processor 2002 may activate one or more, but fewer than all, of the thermal energy emitter/detector devices 1914 that are included in a pattern at any given time, for example, activating a different two or three of the thermal energy emitter/detector devices 1914 of thermal pattern 2801 at a time, as the processor cycles through the pattern. In another such embodiment, processor 2002 may activate a different thermal energy generating module 1912 or a different number of thermal energy emitter/detector devices 1914 of thermal pattern 2801 in each of multiple successive time periods, for example, activating two of the thermal energy emitter/detector devices 1914 in a first time period, three of the thermal energy emitter/detector devices 1914 in a second time period, and activating a single thermal energy emitter/detector device 1914 in a third time period, which two, three, and one thermal energy emitter/detector devices may or may not include one or more of the same thermal energy emitter/detector devices. In another such embodiment, processor 2002 may generate a different thermal pattern in each of multiple successive time periods, for example, generating thermal pattern 2801 at the first time period, generate thermal pattern 2802 at second time period, and generate thermal pattern 2803 at third time period.

In still other embodiments of the present invention, the thermal pattern generated by processor 2002 may be based on an operating context of thermal energy docking station 1900, such as an application being run on the docking station. In one such embodiment, the particular thermal pattern, such as patterns 2801-2803, retrieved and generated by processor 2002 may be based on a determination, by the processor, of an operating context of the docking station, such as a determination, by the processor, of an application selected by a user of the docking station as is known in the art. Processor 2002 then may generate different thermal patterns in association with execution of different applications.

Referring again to logic flow diagram 2700, based on the thermal detection of thermal energy docking station 1900, that is, the detection of the first thermal pattern, user computer device 102 activates (2708) a particular application, adjusts an operational setting of the user computer device, such as changing a display background or adjusting a brightness, a volume, a touch sensitivity, a feature priority, and/or establishes a wireless connectivity, such as a Bluetooth or WiFi connectivity with a detected Bluetooth or WiFi device and in accordance with well-known wireless connectivity establishment techniques, corresponding to the detected first thermal pattern and indicates (2710), for example, displays on touchscreen 104, the activation of the application, the adjustment of the operational setting, and/or the establishment of the wireless connection. Logic flow 2700 then ends (2712). That is, user computer device 102 may maintain, in the at least one memory device 304 of the user computer device, identifiers of multiple thermal patterns, for example, indicators of the thermal energy emitter/detector devices 110 that are activated in association with each such pattern, in association with corresponding applications. When user computer device 102 detects a thermal pattern, the user computer device compares the detected thermal pattern to the maintained thermal patterns, and when a match occurs then the user computer device determines, and activates, the associated application, brightness, volume, features on/off, wireless connectivity, etc.

For example, if thermal energy docking station 1900 is a calendar-based docking station, then in response to detecting the docking station, for example, detecting a thermal pattern identifying the docking station as a calendar-based docking station, user computer device 102, and in particular processor 302 of the user computer device, may execute a time-and-date application maintained by at least one memory device 304 and may display, on touchscreen 104, a current time of day and a current date. By way of another example, if thermal energy docking station 1900 is a navigational docking station, then in response to detecting the docking station, for example, detecting a thermal pattern identifying the docking station as a navigational docking station, user computer device 102, and in particular processor 302, may execute a navigational application maintained by at least one memory device 304, for example, the GOOGLE® MAPS application provided by Google Inc., of Mountain View, Calif., or any other of many well-known navigational applications, and may display, on touchscreen 104, a map that identifies a current location of the user computer device.

In another embodiment of the present invention, for example, when thermal energy docking station 1900 supports multiple different applications for example, maintains thermal patterns associated with the multiple different applications, the thermal pattern generated by the docking station may be a thermal pattern corresponding to a particular application of the multiple different applications. For example, thermal energy docking station 1900 may support a calendar application, a navigational application, an email application, a social network application, such as the FACEBOOK® application provided by Facebook, Inc., of Palo Alto, Calif. A user of thermal energy docking station 1900 may input to thermal energy docking station 1900, and the thermal energy docking station may receive from the user, a selection of an application from among the multiple applications supported by the docking station. For example, the user may input his or her selection via user interface 2006, for example, by selecting an application via mechanical control 2104.

In response to receiving the selection from the user, thermal energy docking station 1900 generates a thermal pattern corresponding to the selected application, by activating thermal energy output devices 1914 corresponding to the thermal pattern. When docked in thermal energy docking station 1900, user computer device 102, and in particular processor 302 via temperature sensitive user interface 108 of the user computer device, thermally detects the selected thermal pattern generated by thermal energy docking station 1900. More particularly, the thermal energy emitter/detector devices 110 of temperature sensitive user interface 108 of user computer device 102 detect the thermal pattern generated by the thermal energy thermal energy emitter/detector devices 1914 of the thermal energy docking station. Based on the thermal detection of the thermal pattern generated by thermal energy docking station 1900, user computer device 102 then activates an application corresponding to the detected thermal pattern and displays the activated application on touchscreen 104.

In yet another embodiment of the present invention, a user of user computer device 102 subsequently may change the application executed by the user computer device by changing the thermal pattern generated by thermal energy docking station 1900. That is, subsequent to docking user computer device 102 in thermal energy docking station 1900, the user may input to thermal energy docking station 190, and the thermal energy docking station may receive (2714) from the user, a selection of a second application from among the multiple applications supported by the docking station. Again, the user may input the selection via user interface 2006, for example, by selecting the second application via mechanical control 2104. In response to receiving the selection from the user, thermal energy docking station 1900 generates (2716) a thermal pattern corresponding to the second application by activating of thermal energy emitter/detector devices 1914. User computer device 102, and in particular processor 302 via temperature sensitive user interface 108 of the user computer device, thermally detects (2718) the second thermal pattern generated by thermal energy docking station 1900. Based on the thermal detection of the second thermal pattern, corresponding to the second application, user computer device 102 then activates (2720) the second application, corresponding to the detected second thermal pattern, and displays (2722) the activated application on touchscreen 104. Logic flow 2700 then ends (2712).

By providing for thermal communication between user computer device 102 and docking station 1900, user computer device 102 can execute, and display, a variety of applications merely by placing the user computer device in the docking station, without any need to plug the user computer device into the docking station or to connect any cables. Furthermore, the application displayed on the user computer device when docked in the docking station may be adjusting by merely inputting an instruction into the docking station, without the need to remove the user computer device from the docking station or the need to going through a variety of menus to find the desired application on the user computer device.

It is foreseeable that a user of user computer device 102 may use the user computer device in both indoor and outdoor environments and in all kinds of temperature conditions. As a result, user computer device 102 may be operated in conditions where a user's temperature is very close to an ambient temperature of the environment in which the user computer device is operating or to an operating temperature of the device itself. In such an instance, the temperature of the thermal energy emitter/detector devices 110 of temperature sensitive user interface 108 of the user computer device 102 may be close to a body temperature of the user, and more particularly to a temperature of the user's fingers, with the result that the temperature sensitive user interface may be unable to detect the user's touch. In order to facilitate an operation of temperature sensitive touchscreen 104 in all environmental and operating conditions, user computer device 102 further provides for an auto-biasing, that is, a pre-tuning, of a temperature of the thermal energy emitter/detector devices 110 of temperature sensitive user interface 108.

Figure 29:
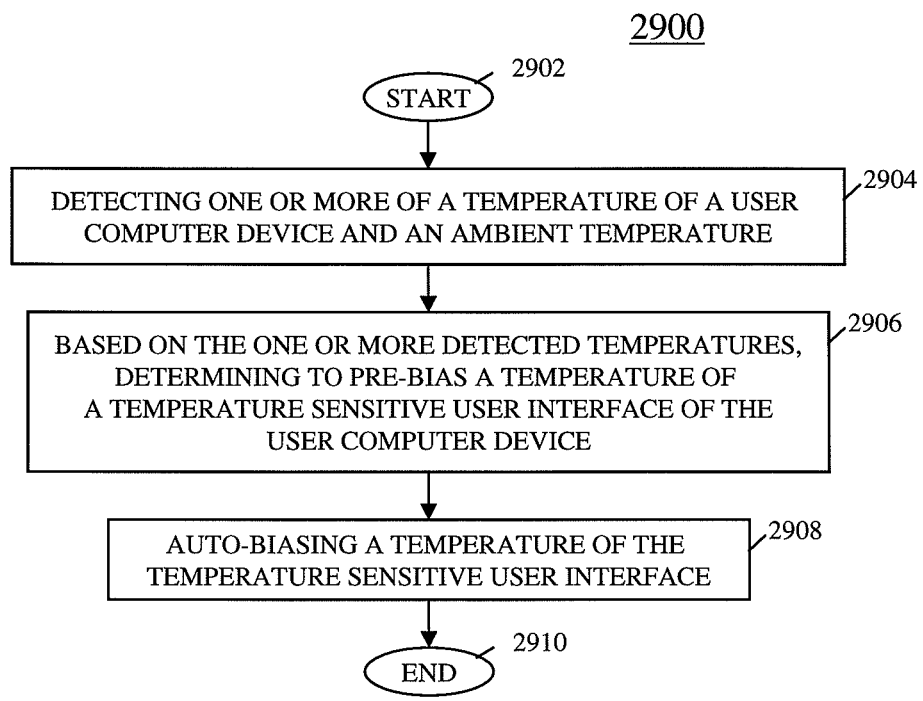
FIG. 29 is a logic flow diagram illustrating a pre-tuning of the temperature sensitive user interface of the user computer device of FIG. 1 in accordance with an embodiment of the present invention.

Referring now to FIG. 29, a logic flow diagram 2900 is provided that illustrates a pre-biasing of temperature sensitive user interface 108 of user computer device 102, and in particular of the thermal energy emitter/detector devices 110 of the temperature sensitive user interface, in accordance with an embodiment of the present invention. Logic flow diagram 2900 begins (2902) when user computer device 102 detects (2904) one or more of a temperature of user computer device 102, such as a temperature of temperature sensitive user interface 108 and/or an operating temperature of the user computer device itself, and an ambient temperature, that is, a temperature of an environment in which the user computer device is operating. For example, the ambient temperature may be a temperature of an immediate physical context of user computer device 102, such as a temperature of a pocket or carrying bag, such as a purse, containing the user computer device, or may be a more remote physical context, such as an outdoor temperature of a geographical location in which a user of user computer device 102 is located, for example, an outdoor temperature in Chicago, Ill. or an indoor temperature of a building, or room in a building, in which the user is located.

For example, sensors 314 of user computer device 102 may include a thermistor that detects an operating temperature of the user computer device and outputs a corresponding voltage to processor 302 in accordance with known techniques. Based on the level of the voltage, processor 302 is able to determine an operating temperature of the user computer device. By way of another example, sensors 314 of user computer device 102 may include a temperature sensor, such as a thermometer, that measures an ambient temperature of the device, or user computer device 102 may execute an application maintained in the at least one memory device 304 and that uses a received broadcast of weather data to estimate the temperature corresponding to your GPS position, such as the 'Thermometer' from Mobiquite, of Niort, France, or weather applications available from WeatherBug®, from Earth Networks, of Germantown, Md., or The Weather Channel® of Cobb County, Georgia, that provide for broadcast of local forecast and temperature information.

Based on the one or more detected temperatures, user computer device 102 determines (2906) to auto-bias, or pre-tune, a temperature of temperature sensitive user interface 108. For example, user computer device 102 may maintain, in at least one memory device 304, a pre-determined temperature range comprising one or more temperature thresholds, for example, a lower temperature threshold and an upper temperature threshold. However, in other embodiments of the present invention, only a single threshold may be used, for example, to trigger auto-biasing when the detected temperature of user computer device 102, such as of temperature sensitive user interface 108, or the detected ambient temperature is below a first temperature threshold or above a second temperature threshold. User computer device 102 then compares the detected temperature to the one or more temperature thresholds and determines whether to auto-bias, or pre-tune, temperature sensitive user interface 108 based on the comparison. For example, if the pre-determined temperature range is a temperature range centered at an average skin temperature, and the detected temperature is inside of the temperature range (for example, above a first, lower temperature threshold and below a second, higher temperature threshold), then user computer device 102 may determine to auto-bias, or pre-tune, temperature sensitive user interface 108 to a temperature outside of the range, for example, by adjusting a temperature of temperature sensitive user interface 108 either below the first temperature threshold or above the second temperature threshold. Thus, a temperature differential between the detected temperature (which may be assumed to be an approximation of the temperature of the user computer device) and a user's touch can more easily be detected. On the other hand, if the detected temperature is outside of the temperature range, then user computer device may determine not to auto-bias, or pre-tune, temperature sensitive user interface 108. In other embodiments of the present invention, only a single threshold may be used, such as either the first, lower temperature threshold or the second, higher temperature threshold, and user computer device 102 may determine to auto-bias, or pre-tune, a temperature of temperature sensitive user interface 108 to a lower temperature when the detected temperature is above the first threshold or to a higher temperature when the detected temperature is below the second threshold.

In another embodiment of the present invention, wherein user computer device 102 detects both the temperature of temperature sensitive user interface 108 and the ambient temperature, user computer device 102 may determine to increase or to decrease a temperature of temperature sensitive user interface 108 based on a comparison of the two detected temperatures. For example, user computer device may determine a difference between the detected temperature of temperature sensitive user interface 108 and the detected ambient temperature. When the temperature difference is less than a temperature differential threshold, then user computer device 108 may determine to auto-bias, for example, to increase (or decrease) the temperature of temperature sensitive user interface 108, that is, to adjust the temperature of temperature sensitive user interface 108 such that the difference between the temperature of the temperature sensitive user interface and the ambient temperature is greater than the temperature differential threshold. On the other hand, when the temperature difference is greater than the temperature differential threshold, then user computer device 108 may determine not to auto-bias the temperature of temperature sensitive user interface 108.

When user computer device 102 determines to auto-bias, or pre-tune, temperature sensitive user interface 108, the user computer device auto-biases (2908), that is, self-tunes, a temperature of the temperature sensitive user interface 108, that is, adjusts a temperature of thermal energy emitter/detector devices 110 of temperature sensitive user interface 108. For example, user computer device 102 may determine to adjust a temperature of the thermal energy emitter/detector devices to a pre-determined temperature level and/or elevate or decrease a temperature of the thermal energy emitter/detector devices by a predetermined amount, which predetermined amount may be based on the detected temperatures (for example, based on the amount of adjustment required to change the temperature of temperature sensitive user interface 108 to being above or below a temperature threshold or to produce a temperature differential between temperature sensitive user interface 108 and the ambient temperature that is greater than the temperature differential threshold). The temperature thresholds, as noted above, the temperature differential threshold, the pre-determined temperature level, and the predetermined amount may each be maintained in at least one memory device 304 of user computer device 102. Logic flow 2900 then ends (2910).

For example, in response to determining to auto-bias temperature sensitive user interface 108, user computer device 102 may auto-bias one or more thermocouple junctions of temperature sensitive user interface 108, or auto-bias a plate carrying the thermocouple junctions, by adjusting a temperature of the one or more thermocouple junctions or the plate to a temperature different from their current temperature, for example, such that a temperature of the thermocouple junctions is different from a user temperature. In one such embodiment of the present invention, the auto-biasing could be enabled by placing a heating element, such as a resistive element, for example, a resistor, near the thermocouple junction areas. Power (for example, an applied voltage or current) then could be continuously applied to the heating elements or could be applied in bursts in time (averaging effects) until the thermocouple junction temperatures are elevated by few degrees, for example, 5-10 degrees.

In another embodiment of the present invention, the auto-biasing of the thermocouple junctions of temperature sensitive user interface 108 could be generated in a TDMA (Time Division Multiple Access) fashion. For example, touchscreen driver 306 may be configured to switch between an input (thermal energy sensing) topology and an output (thermal energy generating) topology in successive time periods, such as sequential time slots. Specifically, during one time slot, the thermocouple junctions are configured as thermocouple touch sensors, generating an output voltage as a function of detected junction temperature. During a next time slot, the thermocouple junctions may be configured as a heating element, generating heat in relation to an applied input voltage.

In still another embodiment of the present invention, auto-biasing could be achieved by harvesting heat already generated by running hardware of user computer device 102. For example, when the user computer device is on and operational, processor 302 generates a high amount of heat. Instead of dissipating all such heat through use of heat sinks, user computer device 102 may use such heat to elevate the temperature of the thermocouple junctions, thereby auto-biasing the junctions. When touched, the thermocouple junctions cool down by dissipating heat into a hand contact area, which may be detected as a delta temperature change.

In yet another embodiment of the present invention, user computer device 102 may store, in at least one memory device 304, a queue of processor intensive (heat generating) tasks that processor 302 of the user computer device needs to perform but is waiting for some condition to occur, such as being plugged into a power outlet or being within range of a WiFi node. If the auto-biasing needs to be performed, the processor could decide to perform one or all of the intensive tasks now, rather than waiting for the occurrence of the condition, so that the internally generated heat can be used to bias the thermal energy emitter/detector devices 110.

In still other embodiments of the present invention, user computer device 102 may decrease a temperature of the temperature sensitive user interface 108, and more particularly of thermal energy emitter/detector devices 110, through use of a thermoelectric cooling system or a liquid coolant system. For example, user computer device 102 may activate a fan (not shown) included in the user computer device or may decrease a temperature of the temperature sensitive user interface through use of a thin-film thermoelectric material (not shown), that may be laminated onto touchscreen 104 and that exhibits significant localized cooling and the potential to pump a significant localized heat flux, or through use of a microscale thermoelectric cooler such for example, the Opto-Cooler· family of thermoelectric coolers available from Nextreme Thermal Solutions, of Durham, N.C. By way of another example, user computer device may decrease a temperature of the temperature sensitive user interface by activating a liquid coolant system, for example, by removing heat from the thermal energy emitter/detector devices by use of heat-pipes or any other liquid refrigerant system that may occur to one of ordinary skill in the art.

By providing for an auto-biasing of the temperature sensitive user interface 108, user computer device 102 better assures a proper operation of the temperature sensitive user interface in all operating conditions, for example, regardless of environmental temperature and even when an ambient temperature, and a corresponding temperature of the thermal energy emitter/detector devices 110 of the temperature sensitive user interface, is approximately the same as a temperature of a user's touch.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for thermal recognition of an external accessory device that may be used in conjunction with a user computer device, the method comprising:
   detecting, by the user computer device, a thermal pattern that identifies the external accessory device;
   in response to detecting the thermal pattern and based on the detected thermal pattern, performing one or more of:
   activating, by the user computer device, an application corresponding to the detected thermal pattern;
   adjusting, by the user computer device, an operational setting of the user computer device;
   establishing a wireless connectivity with the external accessory device; and
   executing, by the user computer device, the one or more of the activated application, the adjusted setting, and the establishment of the wireless connectivity.

2. The method of claim 1, wherein the external accessory device is a docking station for the user computer device.

3. The method of claim 1, wherein establishing a wireless connectivity with the external accessory device comprises establishing a wireless connectivity in accordance with a short-range wireless protocol.

4. The method of claim 3, wherein the short-range wireless protocol comprises one or more of a Bluetooth protocol and an Institute of Electrical and Electronics Engineers (IEEE) 802 protocol.

5. The method of claim 1, wherein detecting comprises receiving, via a temperature sensitive touchscreen of the user computer device, the thermal pattern.

6. The method of claim 1, further comprising determining to thermally authenticate the external accessory device and wherein the thermal pattern is an authentication pattern.

7. The method of claim 1, wherein detecting the thermal pattern comprises detecting a first thermal pattern during a first time period and detecting a second thermal pattern during a second time period, wherein the first thermal pattern is different from the second thermal pattern.

8. The method of claim 1, wherein in response to detecting the thermal pattern and based on the detected thermal pattern, the user computer device activates an application corresponding to the detected thermal pattern and wherein the method further comprises changing the application executed by the user computer device in response to detecting a change in the thermal pattern.

9. The method of claim 1, wherein the detected thermal pattern identifies the external accessory device as one or more of a calendar-based device, a navigational device an email reader, a music player, a video player, a video game controller, a video game console, and a social networking device, and wherein the method comprises one or more of, in response to detecting that the external accessory device is a calendar-based device, executing a time-and-date application, in response to detecting that the external accessory device is a navigational device, executing a navigational application, in response to detecting that the external accessory device is an email reader, executing a email application, in response to detecting that the external accessory device is a music player, executing a music application, in response to detecting that the external accessory device is a video player, executing a video application, in response to detecting that the external accessory device is one of a video game controller and a video game console, executing a video game application, and in response to detecting that the external accessory device is a social networking device, executing a social networking application.

10. A user computer device comprising:
   a housing;
   an at least one memory device that maintains at least one thermal pattern that identifies an external accessory device;
   a temperature sensitive user interface having a plurality of thermal energy devices that are configured to one or more of emit thermal energy and detect thermal energy; and a processor coupled to the temperature sensitive user interface and the at least one memory device and that is configured to detect, via the temperature sensitive user interface, the at least one thermal pattern that identifies the external accessory device, in response to detecting the thermal pattern and based on the detected thermal pattern, perform one or more of: activating an application corresponding to the detected thermal pattern, adjusting an operational setting of the user computer device, and establishing a wireless connectivity with the external accessory device, and execute the one or more of the activated application, the adjusted setting, and the establishment of the wireless connectivity.

11. The user computer device of claim 10, wherein the external accessory device is a docking station for the user computer device.

12. The user computer device of claim 10, wherein the processor is configured to establish a wireless connectivity with the external accessory device by establishing a wireless connectivity in accordance with a short-range wireless protocol.

13. The user computer device of claim 12, wherein the short-range wireless protocol comprises one or more of a Bluetooth protocol and an Institute of Electrical and Electronics Engineers (IEEE) 802 protocol.

14. The user computer device of claim 10, wherein the temperature sensitive user interface is part of a temperature sensitive touchscreen of the user computer device.

15. The user computer device of claim 10, wherein the processor is configured to determine to thermally authenticate the external accessory device and wherein the thermal pattern is an authentication pattern.

16. The user computer device of claim 10, wherein the processor is configured to detect the thermal pattern by detecting a first thermal pattern during a first time period and detecting a second thermal pattern during a second time period, wherein the first thermal pattern is different from the second thermal pattern.

17. The user computer device of claim 10, wherein in response to detecting the thermal pattern and based on the detected thermal pattern, the processor activates an application corresponding to the detected thermal pattern and wherein the processor is configured to change the application executed by the user computer device in response to detecting a change in the thermal pattern.

18. The user computer device of claim 10, wherein the detected thermal pattern identifies the external accessory device as one or more of a calendar-based device, a navigational device, an email reader, a music player, a video player, a video game controller, a video game console, and a social networking device, and wherein the processor is configured to one or more of, in response to detecting that the external accessory device is a calendar-based device, execute a time-and-date application, in response to detecting that the external accessory device is a navigational device, execute a navigational application, in response to detecting that the external accessory device is an email reader, executing a email application, in response to detecting that the external accessory device is a music player, executing a music application, in response to detecting that the external accessory device is a video player, executing a video application, in response to detecting that the external accessory device is one of a video game controller and a video game console, executing a video game application, and in response to detecting that the external accessory device is a social networking device, executing a social networking application.

19. An electronic device for thermally interfacing with a user computer device, the electronic device comprising:
 a thermal energy interface that is configured to exchange thermal energy with the user computer device; and
 a processor coupled to the thermal energy interface that is configured to one or more of generate a thermal pattern in the thermal energy interface that may be detected by the user computer device and detect a thermal pattern emitted by the user computer device.

20. The electronic device of claim 19, further comprising an at least one memory device coupled to the processor that maintains a list of applications that may be executed by the user computer device and that maintains, in association with each such application, a thermal pattern that identifies the application.

21. The electronic device of claim 19, further comprising a user interface that is configured to receive instructions from a user of the electronic device and to provide information to the user of the electronic device.

22. The electronic device of claim 19, wherein the electronic device comprises a docking station for the user computer device.

* * * * *